(12) United States Patent
Rust, III et al.

(10) Patent No.: US 11,600,848 B2
(45) Date of Patent: Mar. 7, 2023

(54) ELECTRODE STRUCTURES FOR THREE-DIMENSIONAL BATTERIES

(71) Applicant: Enovix Corporation, Fremont, CA (US)

(72) Inventors: Harrold J. Rust, III, Alamo, CA (US); Ashok Lahiri, Cupertino, CA (US); Murali Ramasubramanian, Fremont, CA (US); Robert M. Spotnitz, Pleasanton, CA (US); Robert A. Cole, San Jose, CA (US); Gunther A. Koblmiller, Oakley, CA (US); Nirav S. Shah, Pleasanton, CA (US); Brian E. Brusca, Tracy, CA (US); Christopher G. Castledine, Sunnyvale, CA (US); Laurie J. Lauchlan, Saratoga, CA (US); James D. Wilcox, Pleasanton, CA (US)

(73) Assignee: Enovix Corporation, Fremont, CA (US)

( * ) Notice: Subject to any disclaimer, the term of this patent is extended or adjusted under 35 U.S.C. 154(b) by 231 days.

(21) Appl. No.: 16/999,376

(22) Filed: Aug. 21, 2020

(65) Prior Publication Data

US 2020/0381771 A1 Dec. 3, 2020

Related U.S. Application Data

(63) Continuation of application No. 16/048,620, filed on Jul. 30, 2018, now Pat. No. 10,749,207, which is a (Continued)

(51) Int. Cl.
*H01M 10/0525* (2010.01)
*H01M 10/058* (2010.01)
(Continued)

(52) U.S. Cl.
CPC ....... *H01M 10/0525* (2013.01); *H01M 4/133* (2013.01); *H01M 4/134* (2013.01);
(Continued)

(58) Field of Classification Search
CPC ........ H01M 4/13; H01M 4/133; H01M 4/134; H01M 4/386; H01M 4/525; H01M 4/587;
(Continued)

(56) References Cited

U.S. PATENT DOCUMENTS 3,563,805 A 2/1971 Deierhoi
4,587,182 A 5/1986 Stiles et al.
(Continued)

FOREIGN PATENT DOCUMENTS

CA 02388711 5/2001
CN 85106872 6/1986
(Continued)

OTHER PUBLICATIONS

Dierks, S., GuideChem, NickelSilicide (Ni2Si) (cas 12059-14-2) MSDS, Material safety data sheet, retrieved from www.guidechem. com/cas-120/12059-14-2.html, 2 pgs Sep. 30, 1993.
(Continued)

*Primary Examiner* — Ula C Ruddock
*Assistant Examiner* — Scott J Chmielecki
(74) *Attorney, Agent, or Firm* — Bryan Cave Leighton Paisner LLP

(57) ABSTRACT

An electrode structure for use in an energy storage device comprising a population of electrodes, a population of counter-electrodes and a microporous separator separating members of the electrode population from members of the counter-electrode population. Each member of the electrode population comprises an electrode active material layer and an electrode current conductor layer, and each member of the electrode population has a bottom, a top, a length $L_E$, a
(Continued)

width $W_E$ and a height $H_E$, wherein the ratio of $L_E$ to each of $W_E$ and $H_E$ is at least 5:1, the ratio of $H_E$ to $W_E$ is between 0.4:1 and 1000:1, and the electrode current collector layer of each member of the electrode population has a length $L_C$ that is measured in the same direction as and is at least 50% of length $L_E$.

17 Claims, 11 Drawing Sheets

Related U.S. Application Data continuation of application No. 15/489,432, filed on Apr. 17, 2017, now Pat. No. 10,038,214, which is a continuation of application No. 13/957,088, filed on Aug. 1, 2013, now Pat. No. 9,660,292.

(60) Provisional application No. 61/684,036, filed on Aug. 16, 2012.

(51) Int. Cl.
*H01M 4/66* (2006.01)
*H01M 4/38* (2006.01)
*H01M 4/133* (2010.01)
*H01M 4/134* (2010.01)
*H01M 10/052* (2010.01)
*H01M 10/04* (2006.01)
*H01M 4/70* (2006.01)
*H01M 4/525* (2010.01)
*H01M 4/587* (2010.01)

(52) U.S. Cl.
CPC ............ *H01M 4/386* (2013.01); *H01M 4/525* (2013.01); *H01M 4/587* (2013.01); *H01M 4/667* (2013.01); *H01M 4/70* (2013.01); *H01M 10/0436* (2013.01); *H01M 10/052* (2013.01); *H01M 10/058* (2013.01)

(58) Field of Classification Search
CPC .... H01M 4/667; H01M 4/70; H01M 10/0436; H01M 10/052; H01M 10/0525; H01M 10/058; H01M 10/0585; Y02E 60/10; Y02P 70/50
See application file for complete search history.

(56) References Cited

U.S. PATENT DOCUMENTS

| | | | |
|---|---|---|---|
| 5,238,759 A | 8/1993 | Plichta et al. | |
| 5,294,504 A | 3/1994 | Otagawa | |
| 5,350,645 A | 9/1994 | Lake et al. | |
| 5,709,962 A * | 1/1998 | Bailey | G02F 1/153 |
| | | | 429/93 |
| 6,083,640 A | 7/2000 | Lee et al. | |
| 6,090,505 A | 7/2000 | Shimamura et al. | |
| 6,235,427 B1 | 5/2001 | Idota et al. | |
| 6,287,371 B1 | 9/2001 | Ota et al. | |
| 6,355,369 B1 * | 3/2002 | Iarochenko | H01M 4/46 |
| | | | 429/49 |
| 6,383,234 B1 | 5/2002 | Noh | |
| 6,432,579 B1 | 8/2002 | Tsuji et al. | |
| 6,432,585 B1 | 8/2002 | Kawakami | |
| 6,525,391 B1 | 2/2003 | Bertrand et al. | |
| 6,679,925 B1 | 1/2004 | Tanizaki et al. | |
| 6,726,733 B2 | 4/2004 | Lee et al. | |
| 6,791,737 B2 | 9/2004 | Giron | |
| 6,855,378 B1 * | 2/2005 | Narang | C23C 18/06 |
| | | | 429/188 |
| 7,066,971 B1 | 6/2006 | Carlson | |
| 7,309,548 B2 | 12/2007 | Ota et al. | |
| 7,402,829 B2 | 7/2008 | Green | |
| 7,722,984 B2 | 5/2010 | Kim et al. | |
| 7,824,806 B2 | 11/2010 | Visco et al. | |
| 8,101,298 B2 | 1/2012 | Green et al. | |
| 8,129,048 B2 | 3/2012 | Hirakawa et al. | |
| 8,133,613 B2 | 3/2012 | Ramasubramanian et al. | |
| 8,192,788 B1 | 6/2012 | Shah et al. | |
| 8,367,244 B2 | 2/2013 | Ramasubramanian et al. | |
| 8,475,957 B2 | 7/2013 | Rust, III et al. | |
| 8,524,395 B2 | 9/2013 | Ramasubramanian et al. | |
| 8,527,395 B2 | 9/2013 | Ramasubramanian et al. | |
| 8,580,439 B1 | 11/2013 | Kaiser et al. | |
| 8,722,226 B2 | 5/2014 | Chiang et al. | |
| 8,841,030 B2 | 9/2014 | Lahiri et al. | |
| 8,865,345 B1 | 10/2014 | Ramasubramanian et al. | |
| 8,993,159 B2 | 3/2015 | Chiang et al. | |
| 9,105,905 B2 | 8/2015 | Ramasubramanian et al. | |
| 9,153,833 B2 | 10/2015 | Chiang et al. | |
| 9,343,772 B2 | 5/2016 | Byun | |
| 9,356,271 B2 | 5/2016 | Ramasubramanian et al. | |
| 9,362,553 B2 | 6/2016 | Lahiri et al. | |
| 9,660,292 B2 | 5/2017 | Rust, III et al. | |
| 9,692,044 B2 | 6/2017 | Delpuech et al. | |
| 9,806,331 B2 | 10/2017 | Lahiri et al. | |
| 9,991,490 B2 | 6/2018 | Ramasubramanian et al. | |
| 10,020,514 B2 | 7/2018 | Ramasubramanian et al. | |
| 10,038,214 B2 | 7/2018 | Rust, III | |
| 10,177,400 B2 | 1/2019 | Busacca et al. | |
| 10,256,507 B1 | 4/2019 | Busacca et al. | |
| 10,283,807 B2 | 5/2019 | Busacca et al. | |
| 10,707,466 B2 | 7/2020 | Ramasubramanian et al. | |
| 10,749,207 B2 | 8/2020 | Rust, III et al. | |
| 10,784,477 B2 | 9/2020 | Fischer et al. | |
| 11,063,299 B2 | 7/2021 | Busacca et al. | |
| 11,081,718 B2 | 8/2021 | Busacca et al. | |
| 11,128,020 B2 | 9/2021 | Busacca et al. | |
| 2002/0013986 A1 | 2/2002 | Ahn et al. | |
| 2003/0082446 A1 * | 5/2003 | Chiang | H01M 4/0471 |
| | | | 429/210 |
| 2003/0175589 A1 | 9/2003 | Kaminaka et al. | |
| 2004/0048151 A1 | 3/2004 | Hayashi et al. | |
| 2004/0185336 A1 | 9/2004 | Ito et al. | |
| 2004/0214085 A1 | 10/2004 | Sheem et al. | |
| 2004/0234861 A1 | 11/2004 | Kawase et al. | |
| 2004/0241540 A1 | 12/2004 | Tsutsumi et al. | |
| 2004/0253512 A1 | 12/2004 | Watanabe et al. | |
| 2005/0008939 A1 | 1/2005 | Ota et al. | |
| 2005/0095503 A1 | 5/2005 | Adachi et al. | |
| 2005/0130383 A1 | 6/2005 | Divakaruni et al. | |
| 2005/0208379 A1 | 9/2005 | Musha et al. | |
| 2006/0093871 A1 | 5/2006 | Howard | |
| 2007/0002523 A1 | 1/2007 | Ando et al. | |
| 2007/0031733 A1 | 2/2007 | Kogetsu et al. | |
| 2007/0097481 A1 | 5/2007 | Burdis et al. | |
| 2007/0172732 A1 | 7/2007 | Jung et al. | |
| 2007/0285051 A1 | 12/2007 | Jeon et al. | |
| 2008/0003490 A1 | 1/2008 | Christensen | |
| 2008/0081256 A1 | 4/2008 | Madou et al. | |
| 2008/0081257 A1 | 4/2008 | Yoshida et al. | |
| 2008/0233455 A1 * | 9/2008 | Deimede | C08J 5/2256 |
| | | | 429/492 |
| 2009/0023073 A1 | 1/2009 | Okada et al. | |
| 2009/0035664 A1 | 2/2009 | Chiang et al. | |
| 2009/0068567 A1 | 3/2009 | Konishiike et al. | |
| 2009/0123847 A1 | 5/2009 | Okada et al. | |
| 2009/0136844 A1 | 5/2009 | Watanabe et al. | |
| 2009/0142656 A1 | 6/2009 | Nathan et al. | |
| 2009/0155678 A1 | 6/2009 | Less et al. | |
| 2009/0159311 A1 | 6/2009 | Zheng et al. | |
| 2009/0263716 A1 | 10/2009 | Ramasubramanian et al. | |
| 2009/0303660 A1 * | 12/2009 | Nair | H01G 11/32 |
| | | | 429/429 |
| 2010/0040951 A1 | 2/2010 | Yamamoto et al. | |
| 2010/0051856 A1 | 3/2010 | Kim et al. | |
| 2010/0209775 A1 * | 8/2010 | Kim | H01M 4/1395 |
| | | | 429/218.1 |
| 2010/0266907 A1 | 10/2010 | Yazami | |
| 2010/0285368 A1 | 11/2010 | Yamamoto et al. | |
| 2011/0008656 A1 | 1/2011 | Takayuki et al. | |

(56) References Cited

U.S. PATENT DOCUMENTS

| | | |
|---|---|---|
| 2011/0014522 A1 | 1/2011 | Visco et al. |
| 2011/0020701 A1 | 1/2011 | Park et al. |
| 2011/0020713 A1 | 1/2011 | Cui et al. |
| 2011/0020719 A1 | 1/2011 | Manabe et al. |
| 2011/0067228 A1 | 3/2011 | Green |
| 2011/0111283 A1 | 5/2011 | Rust, III et al. |
| 2011/0129732 A1 | 6/2011 | Bachrach et al. |
| 2011/0159328 A1 | 6/2011 | Yeo |
| 2011/0171518 A1 | 7/2011 | Dunn et al. |
| 2011/0200862 A1 | 8/2011 | Kurosawa |
| 2011/0294015 A1 | 12/2011 | Pirk et al. |
| 2012/0052341 A1 | 3/2012 | Kim et al. |
| 2012/0100438 A1 | 4/2012 | Fasching et al. |
| 2012/0176093 A1 | 7/2012 | Ramasubramanian et al. |
| 2012/0202113 A1 | 8/2012 | Hodge et al. |
| 2012/0288742 A1 | 11/2012 | Tanaka et al. |
| 2013/0078493 A1 | 3/2013 | Chen |
| 2013/0136963 A1 | 5/2013 | Chiba |
| 2013/0136973 A1* | 5/2013 | Shenoy ............ H01M 10/0525 429/211 |
| 2013/0143120 A1 | 6/2013 | Ramasubramanian et al. |
| 2013/0189602 A1 | 7/2013 | Lahiri et al. |
| 2013/0202942 A1 | 8/2013 | Sakai et al. |
| 2013/0230751 A1 | 9/2013 | Shaw |
| 2014/0050969 A1 | 2/2014 | Rush, III et al. |
| 2014/0072850 A1* | 3/2014 | Kwon ............... H01M 10/0413 429/94 |
| 2014/0154531 A1 | 6/2014 | Furuya et al. |
| 2014/0272547 A1 | 9/2014 | Ramasubramanian et al. |
| 2014/0335395 A1* | 11/2014 | Ramasubramanian ..................... H01M 10/058 429/142 |
| 2015/0007952 A1 | 1/2015 | Möderl et al. |
| 2015/0024253 A1 | 1/2015 | Noh |
| 2015/0033547 A1 | 2/2015 | Yang et al. |
| 2015/0079452 A1 | 3/2015 | Park et al. |
| 2015/0104686 A1 | 4/2015 | Brommer et al. |
| 2015/0135522 A1 | 5/2015 | Seto et al. |
| 2015/0162575 A1* | 6/2015 | Son ......................... H01M 4/78 429/127 |
| 2016/0197332 A1 | 7/2016 | Lee et al. |
| 2017/0352850 A1 | 12/2017 | Nagane et al. |
| 2018/0040876 A1 | 2/2018 | Lahiri et al. |
| 2018/0079035 A1 | 3/2018 | Watanabe |
| 2018/0145367 A1 | 5/2018 | Busacca et al. |
| 2018/0166735 A1 | 6/2018 | Busacca et al. |
| 2019/0207264 A1 | 7/2019 | Busacca et al. |
| 2019/0221878 A1 | 7/2019 | Busacca et al. |
| 2019/0319294 A1 | 10/2019 | Busacca et al. |
| 2019/0350633 A1 | 11/2019 | Ramadhyani et al. |
| 2019/0372150 A1 | 12/2019 | Busacca et al. |
| 2020/0212493 A1 | 7/2020 | Busacca et al. |
| 2020/0313146 A1 | 10/2020 | Busacca et al. |
| 2022/0115711 A1 | 4/2022 | Busacca et al. |
| 2022/0115753 A1 | 4/2022 | Busacca et al. |
| 2022/0123370 A1 | 4/2022 | Busacca et al. |
| 2022/0149423 A1 | 5/2022 | Busacca et al. |
| 2022/0158220 A1 | 5/2022 | Busacca et al. |
| 2022/0166051 A1 | 5/2022 | Busacca et al. |
| 2022/0173485 A1 | 6/2022 | Busacca et al. |
| 2022/0181702 A1 | 6/2022 | Busacca et al. |

FOREIGN PATENT DOCUMENTS

| | | |
|---|---|---|
| CN | 1286811 | 9/1993 |
| CN | 1555588 | 12/2004 |
| CN | 101960643 | 1/2011 |
| CN | 102007625 | 6/2011 |
| CN | 102569758 | 7/2012 |
| CN | 104347856 | 2/2015 |
| CN | 105518904 | 4/2015 |
| CN | 104662714 | 5/2015 |
| DE | 102018203033 | 9/2018 |
| EP | 0883199 | 12/1998 |
| EP | 1028476 | 8/2000 |
| EP | 1100134 | 5/2001 |
| EP | 1102340 | 5/2001 |
| EP | 1465268 | 10/2004 |
| EP | 1270765 | 1/2007 |
| EP | 2048262 | 4/2009 |
| EP | 2277214 | 10/2009 |
| EP | 2858162 | 4/2015 |
| EP | 2223367 | 6/2015 |
| EP | 3051606 | 8/2016 |
| EP | 3295507 | 3/2018 |
| EP | 3455898 | 3/2019 |
| JP | H01132064 | 5/1989 |
| JP | H06236768 A | 8/1994 |
| JP | 2001185224 | 7/2001 |
| JP | 2003323882 | 11/2003 |
| JP | 2004351500 | 12/2004 |
| JP | 2005149891 | 6/2005 |
| JP | 2006100280 | 4/2006 |
| JP | 2006173001 | 6/2006 |
| JP | 2006236768 | 9/2006 |
| JP | 2006286427 | 10/2006 |
| JP | 2007258160 | 10/2007 |
| JP | 2008140633 A | 6/2008 |
| JP | 2008171732 | 7/2008 |
| JP | 2009170258 A | 7/2009 |
| JP | 2010146732 A | 7/2010 |
| JP | 2010225552 A | 10/2010 |
| JP | 2010262752 A | 11/2010 |
| JP | 2010278125 A | 12/2010 |
| JP | 2011171029 | 9/2011 |
| JP | 2012516941 A | 7/2012 |
| JP | 2012160352 | 8/2012 |
| JP | 2015505120 | 2/2015 |
| JP | 2015064959 A | 4/2015 |
| JP | 2015172997 | 10/2015 |
| JP | 2015220218 | 12/2015 |
| JP | 2019169476 | 10/2019 |
| KR | 20030044508 | 6/2003 |
| KR | 1020060050988 | 5/2006 |
| KR | 1020070021192 | 2/2007 |
| KR | 20130105001 | 9/2013 |
| KR | 1020150010226 | 1/2015 |
| KR | 1020150045456 | 4/2015 |
| NL | 1015956 | 2/2002 |
| TW | 201225385 A | 6/2012 |
| TW | 201414048 | 4/2014 |
| WO | 0243168 A2 | 5/2002 |
| WO | 03105258 | 12/2003 |
| WO | 2005101973 | 11/2005 |
| WO | 2006064344 | 6/2006 |
| WO | 2008030215 | 3/2008 |
| WO | 2008089110 | 7/2008 |
| WO | 2009109834 | 9/2009 |
| WO | 2009129490 | 10/2009 |
| WO | 2009140300 | 11/2009 |
| WO | 2010090956 A2 | 8/2010 |
| WO | 2010092059 | 8/2010 |
| WO | 2010138176 | 12/2010 |
| WO | 2011154862 | 12/2011 |
| WO | 2013112135 | 8/2013 |
| WO | 2013112670 | 8/2013 |
| WO | 2014024424 | 2/2014 |
| WO | 2014028230 A1 | 2/2014 |
| WO | 2014151202 | 9/2014 |
| WO | 2018115016 | 6/2018 |
| WO | 2019099642 | 5/2019 |
| WO | 2019099650 | 5/2019 |
| WO | 2021020480 | 2/2021 |
| WO | 2022108954 | 5/2022 |

OTHER PUBLICATIONS

Google Query Result Page for "Pressure a Rubber Band Can Apply" and "How much pressure does a rubber band have?", 1 page 2021.
Keener Rubber Bands Federal Specifications, retrieved from keener-rubber.com/Federal%20Specifications.htm, 1 page 2021.

(56) References Cited

OTHER PUBLICATIONS

Alliance Rubber Company, Rubber Band Size Chart, retrieved from www.rubberband.com/public/userfiles/sales-collateral/RubberBandChart.pdf, 2 pgs 2021.
Patent Cooperation Treaty, International Search Report issued on PCT/US2012/022393, dated Oct. 10, 2012, 4 pages.
Golodnitsky et al., Advanced materials for the 3D microbattery, Journal of Power Sources, 2006, 153, 281-287.
Long et al., Three-Dimensional battery Architectures, Chemical Reviews, 2004, 104, 4463-4492.
Broussely et al., Li-ion batteries and portable power source prospects for the next 5-10 years, Journal of Power Sources, 136, 2004, 386-394.
Whitehead et al., Current Collectors for positive electrodes of lithium-based batteries, Journal of the Electrochemical Society, 2005, A5105-A2113, 152(11) Sep. 8, 2005.
United Kingdom Search Report dated Dec. 18, 2012, 4 pages dated Dec. 18, 2012.
Patent Cooperation Treaty, International Search report issued for PCT/US2013/022868, dated May 15, 2013, 3 pages dated May 15, 2013.
Harraz et al., Different behavior in immersion plating of nickel on porous silicon from acidic and alkaline fuoride media, J. Electrochem Soc, 150, 5, 2003, pp. C277-C284 Mar. 18, 2003.
Patent Cooperation Treaty, International Search Report for PCT/US2009/041012, dated Sep. 8, 2009, 4 pages dated Sep. 8, 2009.
Liu, C., Bulk Micromachining and Silicon Anisotropic Etching, Foundations of MEMS, Prentice Hall Inc. Chapter 10, pp. 326-370; Prentice Hall Dec. 31, 2006.
Shin et al. Porous Silicon Negative Electrodes for Rachargeable Lithium Batteries, Journal of Power Sources, 139 (2005) 314-320 Sep. 13, 2004.
Vyatkin et al., Random and Ordered Macropore in p-type silicon J. Electrochem. Soc. 149, 1, G70-G76 (2002) Dec. 6, 2001.
Arora, P. et al., "Battery Separators", Chem. Reviews, 2004, 104, 4419-4462 Mar. 30, 2004.
Bourderau et al., "Amorphous Silicon As A Possible Anode Material For Li-Ion Batteries," Journal of Power Sources, 1999, 81-82, 233-236 Sep. 30, 1999.
Li et al., "The Crystal Structural Evolution Of Nano-Si Anode Caused By Lithium Insertion And Extraction At Room Temperature," Solid State Ionics, 2000, 135, 181-191 Nov. 30, 2000.
Kasavajjula et al., Nano- and Bulk-Silicon-Based Insertion Anodes for Lithium-Ion Secondary Cells, Journal of Power Sources, 2007, 1003-1039, 163 Nov. 9, 2006.
Green et al., Structured silicon anodes for lithium battery applications, Electrochemical and Solid State Letters, 6, 2003, A75-A79 Mar. 5, 2003.
Patent Cooperation Treaty, International Search Report for PCT/US2013/053235, dated Jan. 28, 2014, 5 pages dated Jan. 28, 2014.
Patent Cooperation Treaty, International Search Report issued for PCT/US2014/025200, dated Jul. 29, 2014, 4 pages dated Jul. 29, 2014.
Mu et al., Silicon nanotube array/gold electrode for direct electrochemistry of cytochrome C, J. Phys. Chem. B, 2007, 111(6), 1491-1495.
European Patent Office, Extended Search Report for EP 13 74 0825, App. No. 13740825.8, dated Aug. 8, 2015, 9 pages.
Harraz et al., Immersion plating of nickel onto a porous silicon layer from fluoride solutions, Phys. Stat. Sol., 2003, 197(1): 51-56.
Obrovac et al., Reversible cycling of crystalline silicon powder, J. Elect. Soc., 2007, 154(2): A103-A108.
Waidmann et al., Tuning nickel silicide properties using a lamp based RTA, a heat conduction based RTA or a furnace anneal, Microelectronic Engineering, 2006, 83, 2282-2286.
Xu et al., Theoretical studies of displacement disposition of nickel into porous silicon with ultrahigh aspect ration, Electrochimica Acta, 2006, 52, 3901-3909.
Xu et al., Nickel displacement deposition of porous silicon with ultrahigh aspect ratio, J. Elect. Soc., 2007, 154(3): 170-174.
Zhang et al., High aspect ration nickel structions fabricated by electrochemical replication of hydrofluoric acid etched silicon, Electrochemical and Solid-State Letters, 2006, 9(9): C150-C152.
European Patent Office, Extended European Search Report for 12866772.2, EP 2807698, dated Oct. 8, 2015, 3 pages.
Su et al., Silicon-Based Nanomaterials for Lithium-Ion Batteries: A Review, Advanced Energy Materials, 2013, 1-23.
Maranchi et al., High capacity, reversible silicon thin-film anodes for lithium-ion batteries, Electronchemical and Solid-State Letters, 2001, 6(9), A198-A201.
Iaboni et al., Li15SI4 Formation in silicon thin film negative electrodes, Journal of the Electrochemical Society, 2016, 163(2), A255-A261.
European Patent Office, Extended European Search Report for 13829954.0, EP 2885830, dated Feb. 19, 2016, 7 pages.
European Patent Office, Extended European Search Report for 14768734.7, EP 2973785, 10 pages dated Jul. 15, 2016.
Patent Cooperation Treaty, International Search Report for PCT/US2016/032284, dated Aug. 26, 2016, 4 pages dated 2016.
Roberts et al., 3D lithium ion batteries—from fundamentals to fabrication, Journal of Materials Chemistry, Royal Society of Chemistry, 2011, 21: 9876-9890 2011.
Taiwan Search Report for App. No. 102129550, dated Sep. 9, 2016, 1 page dated Sep. 9, 2016.
Patent Cooperation Treaty, International Search Report for PCT/US2017/032355, 4 pages dated Aug. 25, 2017.
Patent Cooperation Treaty, International Search Report for PCT/US2017/061892, 6 pages dated Mar. 27, 2018.
Patent Cooperation Treaty, International Search Report for PCT/US2017/032355, dated Aug. 25, 2017, 4 pages dated 2017.
European Patent Office, Extended European Search Report for Application No. 16793590.7, publication EP 3295507, 7 pages dated Aug. 28, 2018.
Patent Cooperation Treaty, International Search Report for PCT/US2018/061254, 5pgs. dated Mar. 7, 2019.
Patent Cooperation Treaty, International Search Report for PCT/US2018/061245, 10 pages dated May 7, 2019.
European Patent Office, Extended Search Report for EP App. 17796914.4, 10 pages dated Nov. 19, 2019.
European Patent Office, Extended Search Report for EP App. 19197127.4, 3 pages dated Jan. 17, 2020.
European Patent Office, Extended European Search Report for EP 17872332.6, 7 pages dated Sep. 1, 2020.
European Patent Office, Extended European Search Report for 20191612.9, 7 pages dated Mar. 5, 2021.

* cited by examiner

ELECTRODE STRUCTURES FOR THREE-DIMENSIONAL BATTERIES

FIELD OF THE INVENTION

The present invention generally relates to structures for use in energy storage devices, to energy storage devices incorporating such structures, and to methods for producing such structures and energy devices.

BACKGROUND OF THE INVENTION

Rocking chair or insertion secondary batteries are a type of energy storage device in which carrier ions, such as lithium, sodium, potassium, calcium or magnesium ions, move between a positive electrode and a negative electrode through an electrolyte. The secondary battery may comprise a single battery cell, or two more battery cells that have been electrically coupled to form the battery, with each battery cell comprising a positive electrode, a negative electrode, a microporous separator and an electrolyte.

In rocking chair battery cells, both the positive and negative electrodes comprise materials into which a carrier ion inserts and extracts. As a cell is discharged, carrier ions are extracted from the negative electrode and inserted into the positive electrode. As a cell is charged, the reverse process occurs: the carrier ion is extracted from the positive and inserted into the negative electrode.

FIG. 1 shows a cross sectional view of an electrochemical stack of an existing energy storage device, such as a non-aqueous, lithium-ion battery. The electrochemical stack 1 includes a positive electrode current collector 12, on top of which a positive electrode active material layer 13 is assembled. This layer is covered by a microporous separator 14, over which an assembly of a negative electrode current collector 15 and a negative electrode active material layer 16 are placed. This stack is sometimes covered with another separator layer (not shown) above the negative electrode current collector 15, rolled and stuffed into a can, and filled with a non-aqueous electrolyte to assemble a secondary battery.

The positive and negative electrode current collectors pool electric current from the respective active electrochemical electrodes and enable transfer of the current to the environment outside the battery. A portion of a negative electrode current collector is in physical contact with the negative electrode active material while a portion of a positive electrode current collector is in physical contact with the positive electrode active material. The current collectors do not participate in the electrochemical reaction and are therefore restricted to materials that are electrochemically stable in the respective electrochemical potential ranges for the anode and cathode.

To bring current from the current collectors to the environment outside the battery, the negative electrode and positive electrode current collectors are typically each connected to an electrode bus, tab, tag, package feed-through or housing feed-through, typically collectively referred to as contacts. One end of a contact is connected to one or more current collectors while the other end passes through the battery packaging for electrical connection to the environment outside the battery. The negative electrode contact is connected to the negative electrode current collectors and the positive electrode contact is connected to the positive electrode current collectors by welding, crimping, or ultrasonic bonding or is glued in place with an electrically conductive glue.

Conventional wound batteries (see, e.g., U.S. Pat. Nos. 6,090,505 and 6,235,427) typically have electrode materials (active materials, binder, conductivity aid) coated onto a single foil and compressed prior to cell assembly. The foil onto which the electrode is coated onto is typically part of the current collection path. In single jellyroll batteries such as the 18650 or prismatic cells, the current collector foil is ultrasonically welded to electrode buses, tabs, tags etc., that carry the current from the active materials, through the current collector foils and the tabs, to the outside of the battery. Depending on the design, there may be tabs in multiple places along a single jellyroll, or along one place in one or both ends of the current collector foil. Conventional stacked battery pouch cells have multiple plates (or foils) of active material with areas on top of each foil that are subsequently gathered and welded together to a tab; which then carries the current to the outside of the battery pouch (see, e.g., U.S. Patent Publication No. 2005/0008939).

Referring again to FIG. 1, during a charging process, lithium leaves the positive electrode cathode layer 13 and travels through the separator 14 as lithium ions into negative electrode active material layer 16. Depending upon the negative electrode active material used, the lithium ions either intercalate (e.g., sit in a matrix of the negative electrode active material without forming an alloy) or form an alloy. During a discharge process, the lithium leaves negative electrode active material layer 16, travels through the separator 14 and enters positive electrode active material layer 13. The current conductors conduct electrons from the battery contacts (not shown) to the electrodes or vice versa.

Existing energy storage devices, such as batteries, fuel cells, and electrochemical capacitors, typically have two-dimensional laminar architectures (e.g., planar or spiral-wound laminates) as illustrated in FIG. 1 with a surface area of each laminate being roughly equal to its geometrical footprint (ignoring porosity and surface roughness).

Three-dimensional batteries have been proposed in the literature as ways to improve battery capacity and active material utilization. It has been proposed that a three-dimensional architecture may be used to provide higher surface area and higher energy as compared to a two dimensional, laminar battery architecture. There is a benefit to making a three-dimensional energy storage device due to the increased amount of energy that may be obtained out of a small geometric area. See, e.g., Rust et al., WO2008/089110 and Long et. al, "Three-Dimensional Battery Architectures," *Chemical Reviews*, (2004), 104, 4463-4492.

Despite the advances made to-date, a need remains for secondary batteries and other energy storage devices having increased energy density.

SUMMARY OF THE INVENTION

Among the various aspects of the present invention is the provision of three-dimensional structures for use in energy storage devices such as batteries, fuel cells, and electrochemical capacitors. Advantageously, and in accordance with one aspect of the present invention, the proportion of electrode active material relative to the other components of the energy storage device, i.e., the non-active material components of the energy storage device may be increased. As a result, energy storage devices comprising three-dimensional structures of the present invention may have increased energy density. They may also provide a higher rate of energy retrieval than two-dimensional energy storage devices for a specific amount of energy stored, such as by minimizing or reducing transport distances for electron and ion transfer between a positive electrode and negative electrode. These devices may be more suitable for miniaturization and for applications where a geometrical area available for a device is limited and/or where energy density requirement is higher than what may be achieved with a laminar device.

Briefly, therefore, one aspect of the present invention is a structure for use in an energy storage device. The structure comprises an electrode structure including a population of electrodes, a population of counter-electrodes and a microporous separator separating members of the electrode population from members of the counter-electrode population. The populations of electrodes and counter-electrodes are arranged in an alternating sequence in which members of the electrode population are separated from each other by members of the counter-electrode population with the alternating sequence proceeding in a first direction. Each member of the electrode population comprises an electrode active material layer and an electrode current conductor layer, each member of the electrode population having a bottom, a top, a length $L_E$, a width $W_E$ and a height $H_E$, the length $L_E$ being measured from the bottom to the top of each such electrode, the width $W_E$ and the height $H_E$ being measured in directions that are perpendicular to each other and to the direction of measurement of the length $L_E$, the ratio of $L_E$ to each of $W_E$ and $H_E$ being at least 5:1, respectively, the ratio of $H_E$ to $W_E$ being between 0.4:1 and 1000:1. The electrode current collector layer of each member of the electrode population has a length $L_C$ that is measured in the same direction as and is at least 50% of length $L_E$.

Another aspect of the present invention is an electrode structure comprising a population of electrodes, a population of counter-electrodes and a microporous separator separating members of the electrode population from members of the counter-electrode population wherein the population of electrodes is a population of negative electrodes and the population of counter-electrodes is a population of positive electrodes. The populations of electrodes and counter-electrodes are arranged in an alternating sequence in which members of the electrode population are separated from each other by members of the counter-electrode population with the alternating sequence proceeding in a first direction. Each member of the population of negative electrodes comprises a negative electrode active material layer and a negative electrode current conductor layer, each member of the population of negative electrodes has a bottom, a top, a length $L_{NE}$, a width $W_{NE}$ and a height $H_{NE}$, the length $L_{NE}$ being measured from the bottom to the top of each such negative electrode, the width $W_{NE}$ and the height $H_{NE}$ being measured in directions that are perpendicular to each other and to the direction of measurement of the length $L_{NE}$, the ratio of $L_{NE}$ to each of $W_{NE}$ and $H_{NE}$ being at least 5:1, respectively, the ratio of $H_{NE}$ to $W_{NE}$ being between 0.4:1 and 1000:1, the negative electrode current collector layer of each member of the population having a length $L_{NC}$ that is measured in the same direction as and is at least at least 50% of $L_{NE}$.

Another aspect of the present invention is an electrode structure comprising a population of electrodes, a population of counter-electrodes and a microporous separator separating members of the electrode population from members of the counter-electrode population wherein the population of electrodes is a population of positive electrodes and the population of counter-electrodes is a population of negative electrodes. The populations of electrodes and counter-electrodes are arranged in an alternating sequence in which members of the electrode population are separated from each other by members of the counter-electrode population with the alternating sequence proceeding in a first direction. The population of counter-electrodes is a population of negative electrodes, each member of the population of positive electrodes comprises a positive electrode active material layer and a positive electrode current conductor layer, each member of the population of positive electrodes has a bottom, a top, a length $L_{PE}$, a width $W_{PE}$ and a height $H_{PE}$, the length $L_{PE}$ being measured from the bottom to the top of each such positive electrode, the width $W_{PE}$ and the height $H_{PE}$ being measured in directions that are perpendicular to each other and to the direction of measurement of the length $L_{PE}$, the ratio of $L_{PE}$ to each of $W_{PE}$ and $H_{PE}$ being at least 5:1, respectively, the ratio of $H_{PE}$ to $W_{PE}$ being between 0.4:1 and 1000:1, respectively, the positive electrode current collector layer of each member of the positive population having a length $L_{PC}$ that is measured in the same direction as and is at least at least 50% of $L_{PE}$.

Another aspect of the present invention is an electrode structure comprising a population of positive electrodes, a population of negative electrodes and a microporous separator separating members of the positive electrode population from members of the negative electrode population wherein (i) each member of the population of positive electrodes comprises a positive electrode active material layer and a positive electrode current conductor layer, each member of the population of positive electrodes has a bottom, a top, a length $L_{PE}$, a width $W_{PE}$ and a height $H_{PE}$, the length $L_{PE}$ being measured from the bottom to the top of each such positive electrode, the width $W_{PE}$ and the height $H_{PE}$ being measured in directions that are perpendicular to each other and to the direction of measurement of the length $L_{PE}$, the ratio of $L_{PE}$ to each of $W_{PE}$ and $H_{PE}$ being at least 5:1, respectively, the ratio of $H_{PE}$ to $W_{PE}$ being between 0.4:1 and 1000:1, respectively, the positive electrode current collector layer of each member of the positive population having a length $L_{PC}$ that is measured in the same direction as and is at least at least 50% of $L_{PE}$, and (ii) each member of the population of negative electrodes comprises a negative electrode active material layer and a negative electrode current conductor layer, each member of the population of negative electrodes has a bottom, a top, a length $L_{NE}$, a width $W_{NE}$ and a height $H_{NE}$, the length $L_{NE}$ being measured from the bottom to the top of each such negative electrode, the width $W_{NE}$ and the height $H_{NE}$ being measured in directions that are perpendicular to each other and to the direction of measurement of the length $L_{NE}$, the ratio of $L_{NE}$ to each of $W_{NE}$ and $H_{NE}$ being at least 5:1, respectively, the ratio of $H_{NE}$ to $W_{NE}$ being between 0.4:1 and 1000:1, respectively, the negative electrode current collector layer of each member of the negative population having a length $L_{NC}$ that is measured in the same direction as and is at least at least $L_{NE}$.

Another aspect of the present invention is an electrode stack, the stack comprising at least two electrode structures, each of the electrode structures including a population of electrodes, a population of counter-electrodes and a microporous separator separating members of the electrode population from members of the counter-electrode population. The populations of electrodes and counter-electrodes are arranged in an alternating sequence in which members of the electrode population are separated from each other by members of the counter-electrode population with the alternating sequence proceeding in a first direction. Each member of the electrode population comprises an electrode active material layer and an electrode current conductor layer, each member of the electrode population having a bottom, a top, a length $L_E$, a width $W_E$ and a height $H_E$, the length $L_E$ being measured from the bottom to the top of each such electrode, the width $W_E$ and the height $H_E$ being measured in directions that are perpendicular to each other and to the direction of measurement of the length $L_E$, the ratio of $L_E$ to each of $W_E$ and $H_E$ being at least 5:1, respectively, the ratio of $H_E$ to $W_E$ being between 0.4:1 and 1000:1. The electrode current collector layer of each member of the electrode population has a length $L_C$ that is measured in the same direction as and is at least 50% of length $L_E$.

Another aspect of the present invention is a secondary battery, the secondary battery comprising at least two electrode structures and a non-aqueous electrolyte, each of the electrode structures including a population of electrodes, a population of counter-electrodes and a microporous separator permeated with the non-aqueous electrolyte separating members of the electrode population from members of the counter-electrode population. The populations of electrodes and counter-electrodes are arranged in an alternating sequence in which members of the electrode population are separated from each other by members of the counter-electrode population with the alternating sequence proceeding in a first direction. Each member of the electrode population comprises an electrode active material layer and an electrode current conductor layer, each member of the electrode population having a bottom, a top, a length $L_E$, a width $W_E$ and a height $H_E$, the length $L_E$ being measured from the bottom to the top of each such electrode, the width $W_E$ and the height $H_E$ being measured in directions that are perpendicular to each other and to the direction of measurement of the length $L_E$, the ratio of $L_E$ to each of $W_E$ and $H_E$ being at least 5:1, respectively, the ratio of $H_E$ to $W_E$ being between 0.4:1 and 1000:1. The electrode current collector layer of each member of the electrode population has a length $L_C$ that is measured in the same direction as and is at least 50% of length $L_E$.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE PREFERRED EMBODIMENTS

Figure 1:
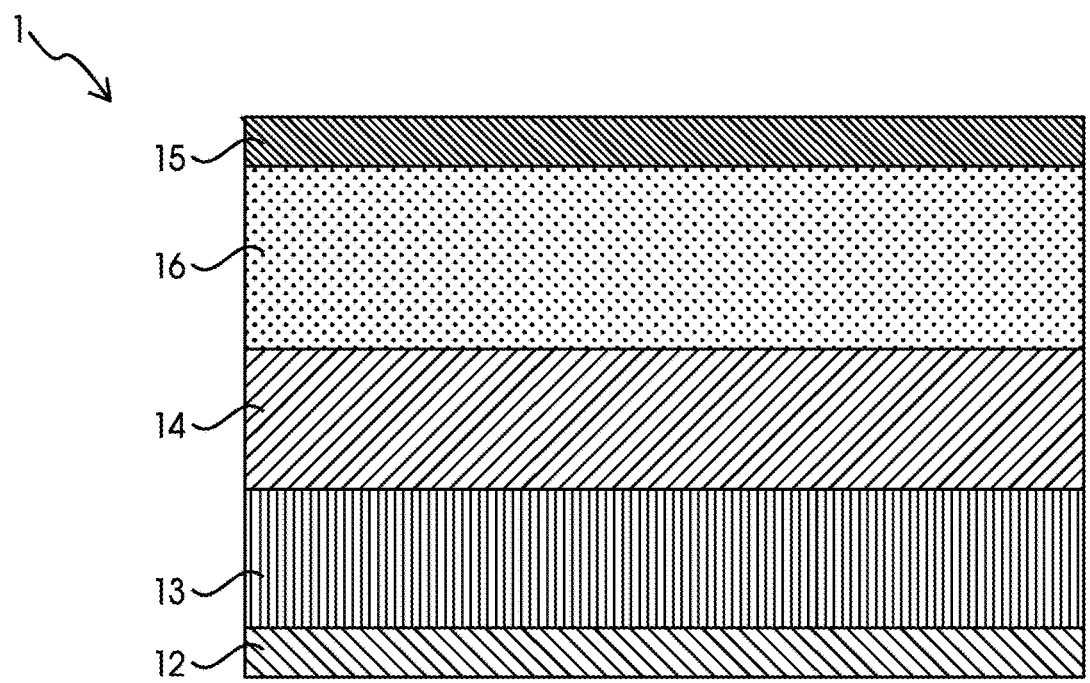
FIG. 1 is a cross-section of a cell of an electrochemical stack of a typical, prior art, two-dimensional energy storage device such as a lithium ion battery.

Among the various aspects of the present invention may be noted three-dimensional structures offering particular advantages when incorporated into energy storage devices such as batteries, capacitors, and fuel cells. For example, such structures may be incorporated into secondary batteries in which the positive electrode, negative electrode, and/or a separator are non-laminar in nature. Advantageously, the surface area for such non-laminar positive and negative electrode structures may exceed the geometrical footprint of a base supporting the electrodes by a factor of 1.5, a factor of 2, a factor of 2.5 or even a factor of 3 or more. In one preferred exemplary embodiment, such structures are incorporated into secondary batteries in which carrier ions (selected, for example, from lithium, sodium, potassium, calcium and magnesium ions) move between the positive and negative electrodes.

In general, the three-dimensional structure comprises an electrode structure comprising a population of electrodes, a population of counter-electrodes and a microporous separator separating members of the electrode population from members of the counter-electrode population. The populations of electrodes and counter-electrodes are arranged in an alternating sequence in which substantially each member of the electrode population is between two members of the counter-electrode population and substantially each member of the counter-electrode population is between two members of the electrode population with the alternating sequence proceeding in a first direction. For example, with the exception of the first and last electrode or counter-electrode in the alternating series, in one embodiment each electrode in the alternating series is between two counter-electrodes and each counter-electrode in the alternating series is between two electrodes.

Each member of the electrode population comprises an electrode active material layer and an electrode current conductor layer, each member of the electrode population having a bottom, a top, a length $L_E$, a width $W_E$, a height $H_E$, and a perimeter $P_E$, the length $L_E$ being measured from the bottom to the top of each such electrode, the width $W_E$ and the height $H_E$ being measured in directions that are perpendicular to each other and to the direction of measurement of the length $L_E$, the ratio of $L_E$ to each of $W_E$ and $H_E$ being at least 5:1, respectively, the ratio of $H_E$ to $W_E$ being between 0.4:1 and 1000:1, and the ratio of $L_E$ to $P_E$ for each member of the electrode population being at least 1.25:1. The electrode current collector layer of each member of the electrode population has a length $L_{E-C}$ that is measured in the same direction as and is at least 50% of length $L_E$. In general, members of the electrode population will typically have a length ($L_E$) in the range of about 5 mm to about 500 mm. In certain embodiments, each member of the electrode population has a length $L_E$ in the range of about 10 mm to about 250 mm. By way of further example, in one such embodiment the members of the electrode population have a length ($L_E$) of about 25 mm to about 100 mm.

In one embodiment, each member of the counter-electrode population comprises a counter-electrode active material layer and a counter-electrode current conductor layer and each member of the counter-electrode population is proportioned similarly to each member of the electrode population. That is, each member of the counter-electrode population has a bottom, a top, a length $L_{CE}$, a width $W_{CE}$, a height $H_{CE}$, and a perimeter $P_{CE}$, the length $L_{CE}$ being measured from the bottom to the top of each such counter-electrode, the width $W_{CE}$ and the height $H_{CE}$ being measured in directions that are perpendicular to each other and to the direction of measurement of the length $L_{CE}$, the ratio of $L_{CE}$ to each of $W_{CE}$ and $H_{CE}$ being at least 5:1, respectively, the ratio of $H_{CE}$ to $W_{CE}$ being between 0.4:1 and 1000:1, and the ratio of $L_{CE}$ to $P_{CE}$ for each member of the counter-electrode population being at least 1.25:1. In this embodiment, the counter-electrode current collector layer of each member of the electrode population has a length $L_{CE-C}$ that is measured in the same direction as and is at least 50% of length $L_{CE}$. In general, members of the counter-electrode population will typically have a length ($L_{CE}$) in the range of about 5 mm to about 500 mm. In certain embodiments, each member of the counter-electrode population has a length $L_{CE}$ in the range of about 10 mm to about 250 mm. By way of further example, in one such embodiment the members of the counter-electrode population have a length ($L_{CE}$) of about 25 mm to about 100 mm.

The population of electrodes may be a population of negative electrodes, and the population of counter-electrodes may be a population of positive electrodes. In this embodiment, length $L_E$, width $W_E$, height $H_E$ and perimeter $P_E$ of each member of the electrode population correspond to the length $L_{NE}$, width $W_{NE}$, height $H_{NE}$ and perimeter $P_{NE}$, respectively, of each member of the negative electrode population and the length $L_{E-C}$ of the current collector of each member of the electrode population corresponds to the length $L_{NC}$ of the current collector of each member of the negative electrode population. Additionally, the length $L_{CE}$, width $W_{CE}$, height $H_{CE}$ and perimeter $P_{CE}$ of each member of the counter-electrode population correspond to the length $L_{PE}$, width $W_{PE}$, height $H_{PE}$, and perimeter $P_{PE}$, respectively, of each member of the positive electrode population and the length $L_{CE-C}$ of the current collector of each member of the counter-electrode population corresponds to the length $L_{PC}$ of the current collector of each member of the positive electrode population.

In an alternative embodiment, the population of electrodes is a population of positive electrodes, and the population of counter-electrodes is a population of negative electrodes. In this embodiment, therefore, length $L_E$, width $W_E$, height $H_E$, and perimeter $P_E$ of each member of the electrode population correspond to the length $L_{PE}$, width $W_{PE}$, height $H_{PE}$, and perimeter $P_{PE}$, respectively, of each member of the positive electrode population and the length $L_{E-C}$ of the current collector of each member of the electrode population corresponds to the length $L_{PC}$ of the current collector of each member of the positive electrode population. Additionally, the length $L_{CE}$, width $W_{CE}$, height $H_{CE}$ and perimeter $P_{CE}$ of each member of the counter-electrode population correspond to the length $L_{NE}$, width $W_{NE}$, height $H_{NE}$ and perimeter $P_{NE}$, respectively, of each member of the negative electrode population and the length $L_{CE-C}$ of the current collector of each member of the counter-electrode population corresponds to the length $L_{NC}$ of the current collector of each member of the negative electrode population.

In certain embodiments, the populations of positive and negative electrodes will have length, width and height dimensions approximating those of a rectangular cuboid. In such instances, the width $W_E$ and the height $H_E$ of each such electrode is measured in directions that are perpendicular to each other and to the direction of measurement of the length $L_E$. In other embodiments, the populations of positive and/or negative electrodes may be shaped differently having, for example, a cross-sectional shape of a trapezoid, a parallelogram, a triangle, a diamond or an oval. In such embodiments, the length $L_E$ of the electrodes is measured from the bottom to the top of each such electrode and the width $W_E$ and the height $H_E$ of each such electrode is measured in directions that are perpendicular to each other and to the direction of measurement of the length $L_E$. Additionally, the width $W_E$ and the height $H_E$ are the maximum width and height of a projection of the electrode in a plane that is normal to the length direction; stated differently, the width $W_E$ and the height $H_E$ correspond to the lengths of the two adjacent sides of an imaginary rectangle in a plane that is normal to the length direction that has the smallest dimensions but yet contains all of the points of the projection of the electrode.

Figure 18A:
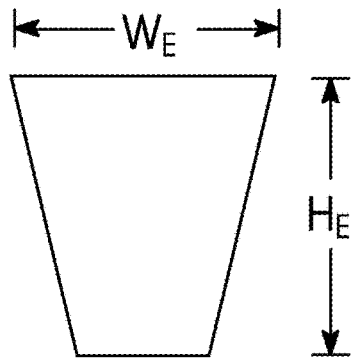
FIGS. 18A-E are a cross-section of alternative embodiments of an electrode (positive electrode or negative electrode) of the present invention.
Figure 18B:
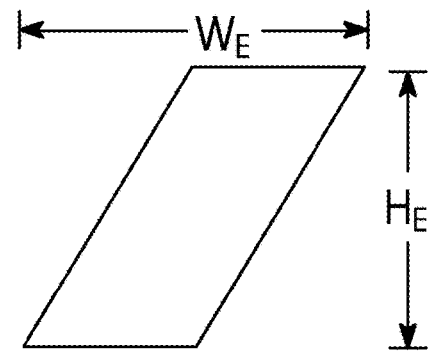
Figure 18C:
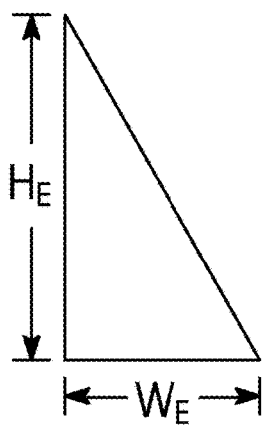
Figure 18D:
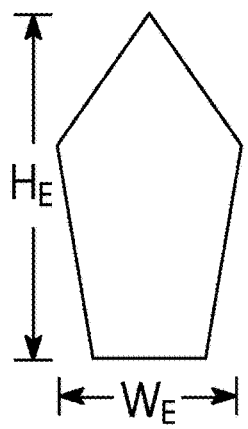
Figure 18E:
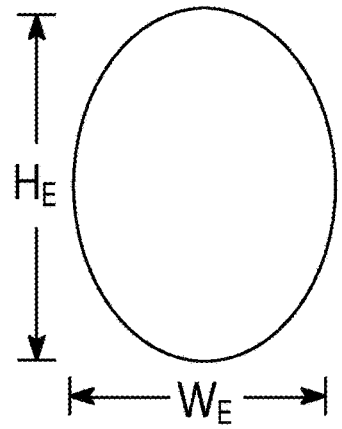

FIGS. 18A-E illustrative several alternative projections of an electrode (positive or negative electrode) in a plane that is normal to the length direction of the electrode. In FIGS. 18A-E, the projection of the electrode traces a trapezoid (FIG. 18A), a parallelogram (FIG. 18B), a triangle (FIG. 18C), a diamond (FIG. 18D) and an oval (FIG. 18E). In each instance, an imaginary rectangle having the smallest dimensions but yet containing all of the points of the projection of the electrode would have width $W_E$ and height $H_E$.

Figure 2:
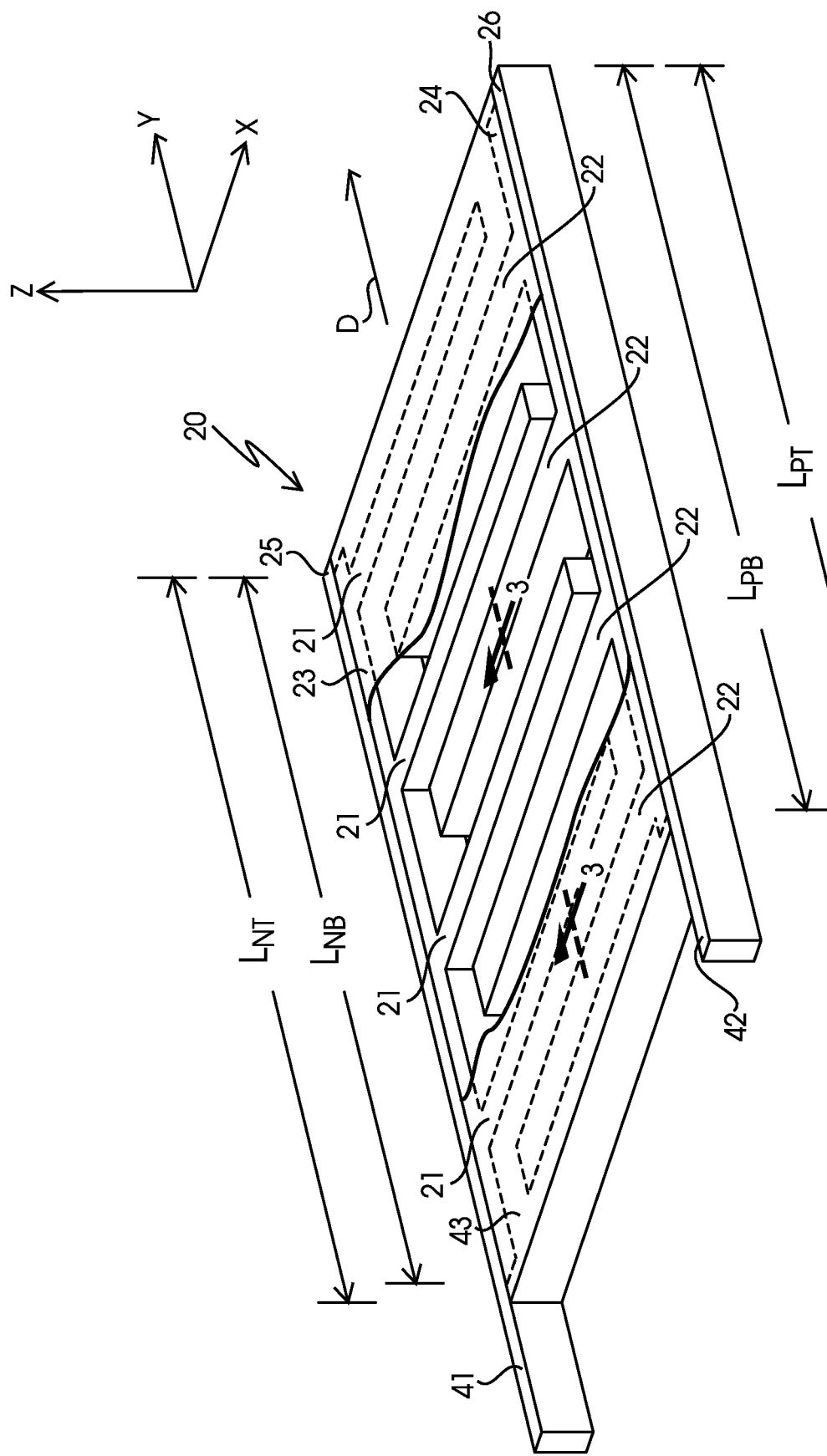
FIG. 2 is a perspective view of one embodiment of an electrode structure of the present invention with parts broken away to show internal construction.

Referring now to FIG. 2, and in one embodiment of the present invention, an electrode structure 20 comprises a population of negative electrodes 21 directly connected to and extending from negative electrode bus 23 and a population of positive electrodes 22 directly connected to and extending from positive electrode bus 24. As illustrated in FIG. 2, the population of negative electrodes 21 includes four members and the population of positive electrodes 22 includes four members; in practice, however, the population of negative electrodes and the population of positive electrodes may each comprise a greater or lesser number of members. For example, the population of negative electrodes and the population of positive electrodes comprised by an electrode structure of the present invention may each include at least 5 members. By way of further example, in one embodiment the population of negative electrodes and the population of positive electrodes each include at least 10 members. By way of further example, in one embodiment the population of negative electrodes and the population of positive electrodes each include at least 50 members. By way of further example, in one embodiment the population of negative electrodes and the population of positive electrodes each include at least 100 members. Additionally, the populations of positive and negative electrodes are interdigitated and arranged in an alternating series of electrodes such that each member of the population of negative electrodes is adjacent to a member of the population of positive electrodes. In one embodiment, for example, each negative electrode is between two members of the population of positive electrodes such that the interdigitated series begins and ends with a positive electrode and each negative electrode is between two positive electrodes (e.g., a series of electrodes having the following repeat sequence: positive electrode, negative electrode, positive electrode, negative electrode, positive electrode . . . ) with the interdigitated series progressing in direction D. In another embodiment, for example, each positive electrode is between two members of the population of negative electrodes such that the interdigitated series begins and ends with a negative electrode and each positive electrode is between two negative electrodes (e.g., a series of electrodes having the following repeat sequence: negative electrode, positive electrode, negative electrode, positive electrode, negative electrode . . . ) with the interdigitated series progressing in direction D. In one embodiment, the negative electrode population has N members, the positive electrode population has N+1 members, each negative electrode is between two positive electrodes, and N is at least 5, 10, 25, 50 or even at least 100. In another embodiment, the positive electrode population has N members, the negative electrode population has N+1 members, each positive electrode is between two negative electrodes, and N is at least 5, 10, 25, 50 or even at least 100. In yet another embodiment, the positive electrode population and the negative electrode population each have N members, each of N−1 positive electrode population members is between two negative electrodes, each of N−1 negative electrode population members is between two positive electrodes, and N is at least 5, 10, 25, 50 or even at least 100.

Each member 21 of the population of negative electrodes extends from and is electrically connected to negative electrode bus 23 which pools current from each member of the population of negative electrodes. Negative electrode bus 23 has length $L_{NB}$, measured in direction D and extending substantially the entire length of the interdigitated series of electrodes, width $W_{NB}$ (FIGS. 5 and 9) and height $H_{NB}$ (FIG. 9) with the direction of measurement of $W_{NB}$ and $H_{NB}$ being perpendicular to each other and to the direction of measurement of length $L_{NB}$. In the context of the X-Y-Z coordinate system depicted in FIG. 2, width $W_{NB}$ is measured along the "X" axis, height $H_{NB}$ is measured along the "Z" axis and length $L_{NB}$ is measured along the "Y" axis of the illustrated X-Y-Z coordinate system wherein the X, Y and Z axes are perpendicular to each other and direction D and the "Y" axis are coincident. In addition, the length $L_{NB}$ of the negative electrode bus is greater than the width $W_{NB}$ and the height $H_{NB}$ of the negative electrode bus; stated differently, the length is the longest dimension of the negative electrode bus. In general, the ratio of $L_{NB}$ to each of $W_{NB}$ and $H_{NB}$ is at least 5:1. For example, in one embodiment the ratio of $L_{NB}$ to each of $W_{NB}$ and $H_{NB}$ is at least 10:1. By way of further example, in one embodiment the ratio of $L_{NB}$ to each of $W_{NB}$ and $H_{NB}$ is at least 25:1. Additionally, the ratio of $H_{NB}$ to $W_{NB}$ is generally in the range of about 1:1 to about 10,000:1, respectively, with a ratio of $H_{NB}$ to $W_{NB}$ being in the range of about 100:1 to about 1,000:1 in some embodiments.

Figure 5:
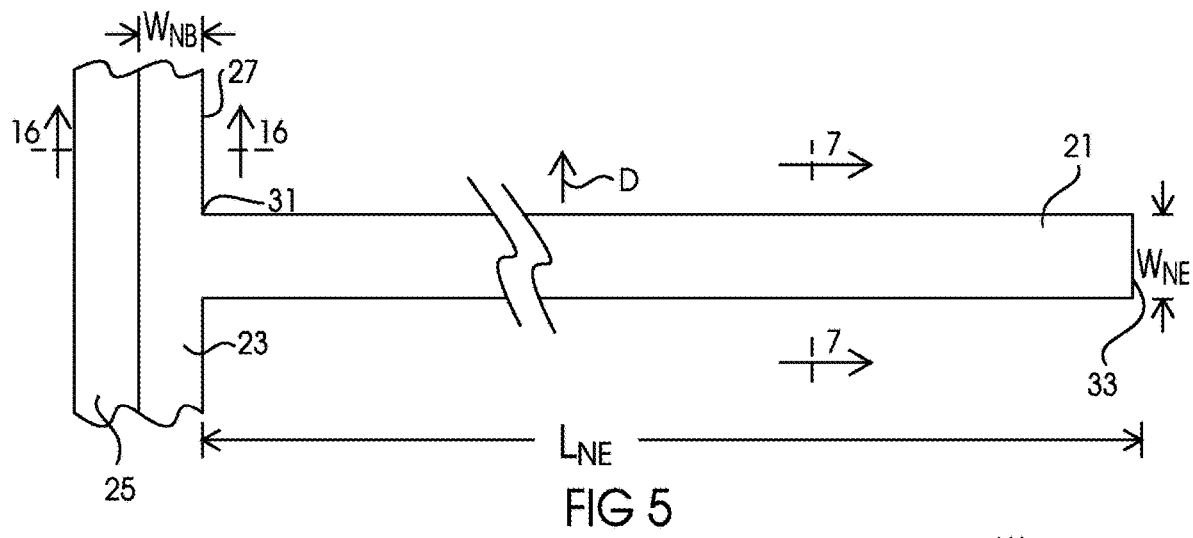
FIG. 5 is a top plan view of a subassembly of the electrode structure of FIG. 4 taken along line 5.
Figure 9:
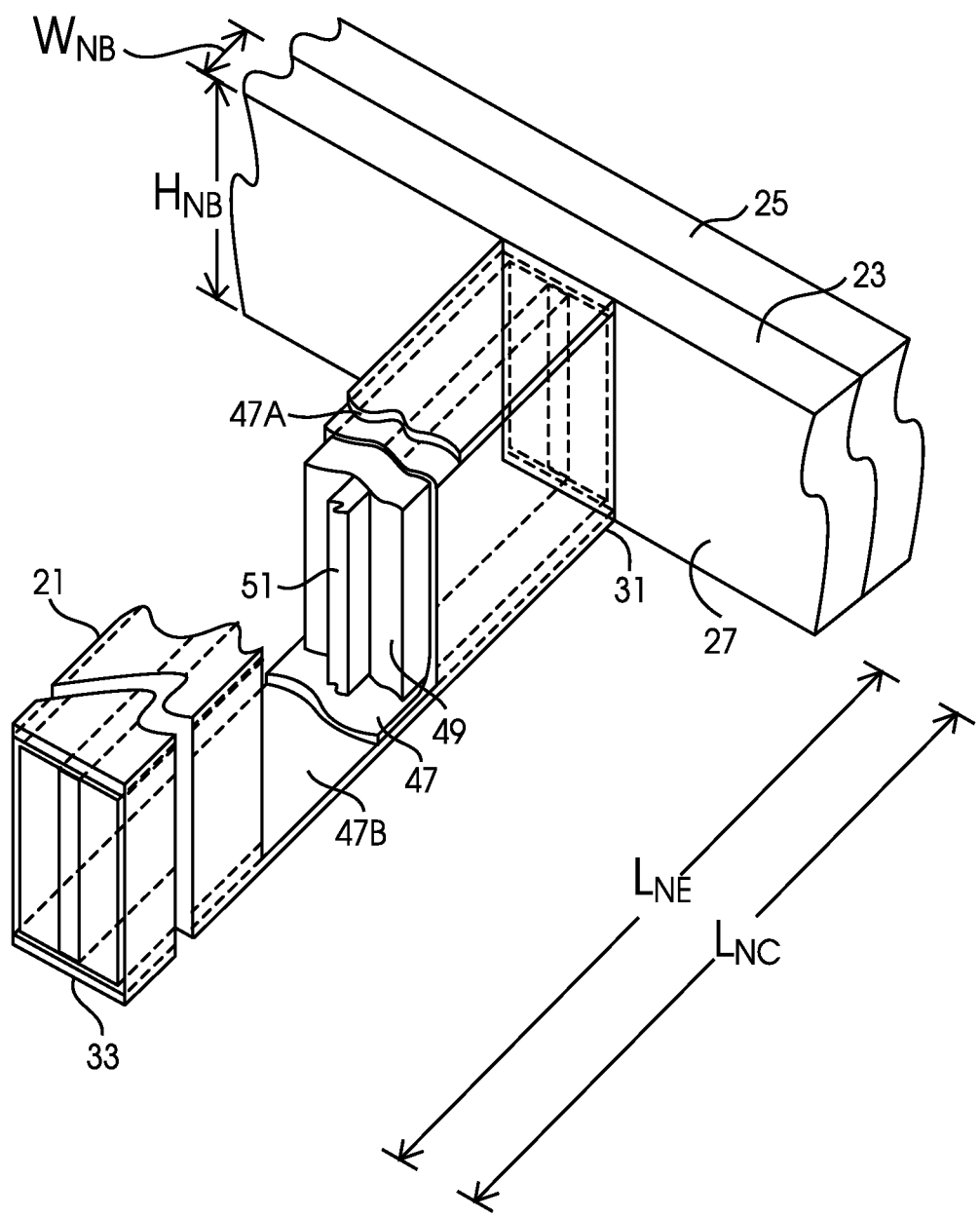
FIG. 9 is a fragmentary perspective view of a subassembly of the electrode structure of FIG. 4 taken along line 5 with parts broken away to show internal construction.

In the embodiment illustrated in FIGS. 5 and 9, negative electrode bus has a constant width $W_{NB}$ and a constant height $H_{NB}$ as a function of length. In other embodiments, the negative electrode bus width $W_{NB}$ or height $H_{NB}$ may vary as a function of negative electrode bus length or the negative electrode bus may have a cross-section (taken in a plane that is normal to the length direction) that is other than rectangular. In such other embodiments, width $W_{NB}$ and height $H_{NB}$ refer to the maximum width and the maximum height of a projection of the negative electrode bus in a plane that is normal to the length direction, i.e., normal to direction D (see e.g., FIGS. 18A-E which illustrate the maximum width $W_E$ and the maximum height $H_E$ for a series of electrodes having a cross-sectional shape of a trapezoid (FIG. 18A), a parallelogram (FIG. 18B), a triangle (FIG. 18C), a diamond (FIG. 18D) and an oval (FIG. 18E)). Stated differently, width $W_{NB}$ and height $H_{NB}$ correspond to the lengths of two adjacent sides of an imaginary rectangle lying in the plane that is normal to the length direction and has the smallest dimensions but yet contains all of the points of the projection of the negative electrode bus.

In addition to each member 21 of the population of negative electrodes, negative electrode bus 23 is electrically connected to negative electrode tab 41 which may be used to electrically connect the population of negative electrodes 21 to the negative terminal of an energy storage device (not shown). In the embodiment illustrated in FIG. 2, negative electrode tab 41 includes negative electrode tab extension 25 which has a length $L_{NT}$ that runs substantially the entire length $L_{NB}$ of negative electrode bus 23. For example, in one embodiment negative electrode tab extension 25 has a length $L_{NT}$ that is at least 50%, at least 75% or even at least 90% of the length $L_{NB}$ of negative electrode bus 23. In other embodiments, negative electrode tab extension 25 may have a length $L_{NT}$ that is substantially less than length $L_{NB}$ (e.g., $L_{NT}$ is less than 50%, 25% or even less than 10% of length $L_{NB}$) or negative electrode tab extension 25 may be omitted in its entirety and negative electrode tab 41 is electrically connected directly to negative electrode bus 23 at either end or at a position intermediate thereof along the length $L_{NB}$ of negative electrode bus 23.

Each member 22 of the population of positive electrodes extends from and is electrically connected to positive electrode bus 24 which pools current from each member 22 of the population of positive electrodes. Positive electrode bus 24 has length $L_{PB}$, measured in direction D and extending substantially the entire length of the interdigitated series of electrodes, width $W_{PB}$ (FIGS. 6 and 10) and height $H_{PB}$ (FIG. 10) with the direction of measurement of $W_{PB}$ and $H_{PB}$ being perpendicular to each other and to the direction of measurement of length $L_{PB}$. In the context of the X-Y-Z coordinate system depicted in FIG. 2, width $W_{PB}$ is measured along the "X" axis, height $H_{PB}$ is measured along the "Z" axis and length $L_{PB}$ is measured along the "Y" axis of the illustrated X-Y-Z coordinate system wherein the X, Y and Z axes are perpendicular to each other and direction D and the "Y" axis are coincident. In addition, the length $L_{PB}$ of the positive electrode bus is greater than the width $W_{PB}$ and the height $H_{PB}$ of the positive electrode bus; stated differently, the length is the longest dimension of the positive electrode bus. In general, the ratio of $L_{PB}$ to each of $W_{PB}$ and $H_{PB}$ is at least 5:1. For example, in one embodiment the ratio of $L_{PB}$ to each of $W_{PB}$ and $H_{PB}$ is at least 10:1. By way of further example, in one embodiment the ratio of $L_{PB}$ to each of $W_{PB}$ and $H_{PB}$ is at least 25:1. Additionally, the ratio of $H_{PB}$ to $W_{PB}$ is generally in the range of about 1:1 to about 10,000:1, respectively, with a ratio of $H_{PB}$ to $W_{PB}$ being in the range of about 100:1 to about 1,000:1 in some embodiments.

Figure 6:
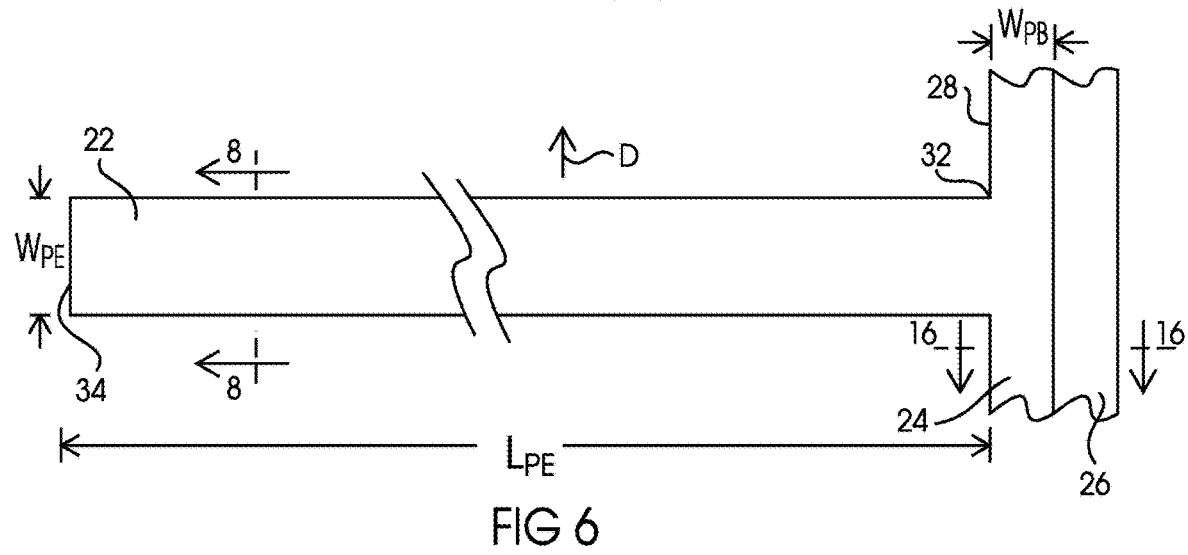
FIG. 6 is a top plan view of a subassembly of the electrode structure of FIG. 4 taken along line 6.
Figure 10:
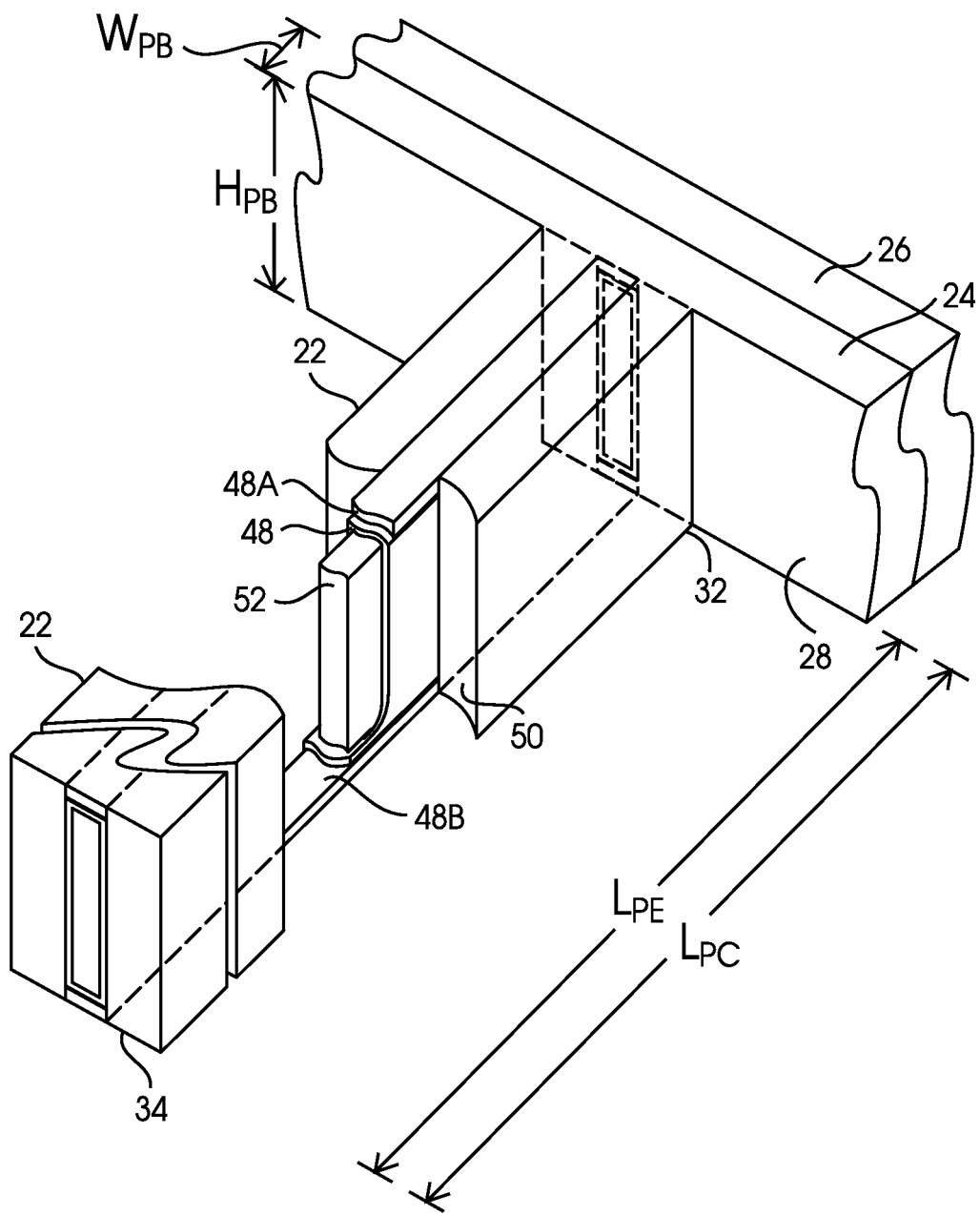
FIG. 10 is a fragmentary perspective view of a subassembly of the electrode structure of FIG. 4 taken along line 6 with parts broken away to show internal construction.

In the embodiment illustrated in FIGS. 6 and 10, positive electrode bus has a constant width $W_{PB}$ and a constant height $H_{PB}$ as a function of length. In other embodiments, the positive electrode bus width $W_{PB}$ or height $H_{PB}$ may vary as a function of positive electrode bus length or the positive electrode bus may have a cross-section (taken in a plane that is normal to the length direction) that is other than rectangular. In such other embodiments, width $W_{PB}$ and height $H_{PB}$ refer to the maximum width and the maximum height of a projection of the positive electrode bus in a plane that is normal to the length direction, i.e., normal to direction D. Stated differently, width $W_{PB}$ and height $H_{PB}$ correspond to the lengths of two adjacent sides of an imaginary rectangle lying in the plane that has the smallest dimensions but yet contains all of the points of the projection of the positive electrode bus.

In addition to each member 22 of the population of positive electrodes, positive electrode bus 24 is electrically connected to positive electrode tab 42 which may be used to electrically connect the population of negative electrodes 22 to the positive terminal of an energy storage device (not shown). In the embodiment illustrated in FIG. 2, positive electrode tab 42 includes positive electrode tab extension 26 has a length $L_{PT}$ that which runs substantially the entire length $L_{PB}$ of positive electrode bus 24. For example, in one embodiment positive electrode tab extension 25 has a length $L_{PT}$ that is at least 50%, at least 75% or even at least 90% of the length $L_{PB}$ of positive electrode bus 23. In other embodiments, positive electrode tab extension 26 may have a length $L_{PT}$ that is substantially less than length $L_{PB}$ (e.g., $L_{PT}$ is less than 50%, 25% or even less than 10% of length $L_{PB}$) or positive electrode tab extension 26 may be omitted in its entirety and positive electrode tab 42 is electrically connected to positive electrode bus 24 at either end or at a position thereof along the length $L_{PB}$ of positive electrode bus 24.

Microporous separator layer 43 electrically isolates each member 21 of the negative electrode population from each member 22 of the positive electrode population and electrically isolates negative electrode bus 23 from positive electrode bus 24. When incorporated into a secondary battery, microporous separator layer 43 will typically be permeated with a non-aqueous electrolyte that is conventionally used for non-aqueous electrolyte secondary batteries. In general, the microporous separator will comprise pores having a diameter of at least 50 Å and typically in the range of about 2,500 Å. Additionally, the microporous separator will generally have a porosity of at least 25%. Typically, however, the microporous separator will have a porosity of less than about 75%. In one embodiment, the microporous separator will have a porosity of about 35-55%.

Figure 3:
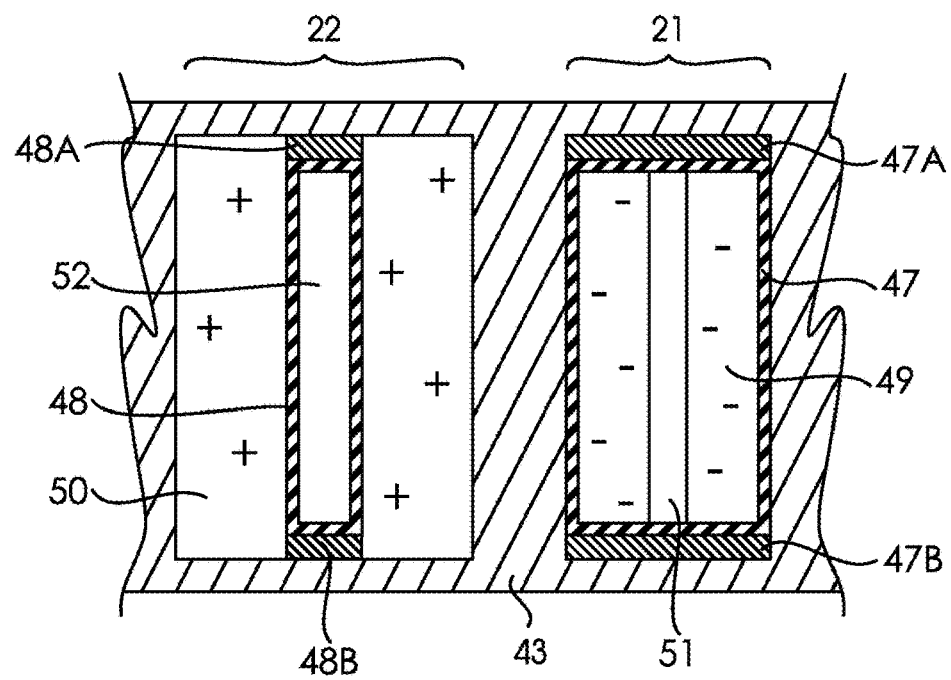
FIG. 3 is a fragmentary cross-section of the electrode structure of FIG. 2 taken in the plane containing the line 3-3.

Referring now to FIG. 3, in one embodiment each member 21 of the population of negative electrodes comprises negative electrode backbone 51, negative electrode active material layer 49, negative electrode current collector layer 47 and supplemental negative electrode current collector layers 47A, 47B. Similarly, each member 22 of the population of positive electrodes comprises positive electrode backbone 52, positive electrode current collector layer 48, supplemental positive electrode current collector layers 48A, 48B and positive electrode active material layer 50. Each member 21 of the population of negative electrodes is separated from each member 22 of the population of positive electrodes by microporous separator layer 43.

During a discharge process, lithium ions (or other carrier ions such as sodium, potassium, calcium or magnesium ions) leave the negative electrode active material layer 49 and travel through negative electrode current collector layer 47 and separator layer 43 and into positive electrode active material layer 50. During a charging process, lithium ions (or other carrier ions) leave positive electrode active material layer 50 and travel through separator layer 43 and negative electrode current collector layer 47 and into negative electrode active material layer 49. Depending on the negative electrode active material used, the lithium ions (or other carrier ions) either intercalate (e.g., sit in a matrix of negative electrode active material without forming an alloy) or form an alloy. Coincident with the movement of lithium ions (or other carrier ions) between the positive and negative electrodes, electrons are carried by negative electrode current collector 47 and supplemental negative electrode current collectors 47A, 47B and the positive electrode current collector 48 and supplemental positive electrode current collectors 48A, 48B to (or from) negative and positive electrode buses 23, 24, respectively (see FIG. 2). Negative and positive electrode buses 23, 24, in turn, are electrically connected via negative electrode tab 41 and positive electrode tab 42, respectively, to the negative and positive terminals of an energy storage device (not shown).

Figure 4:
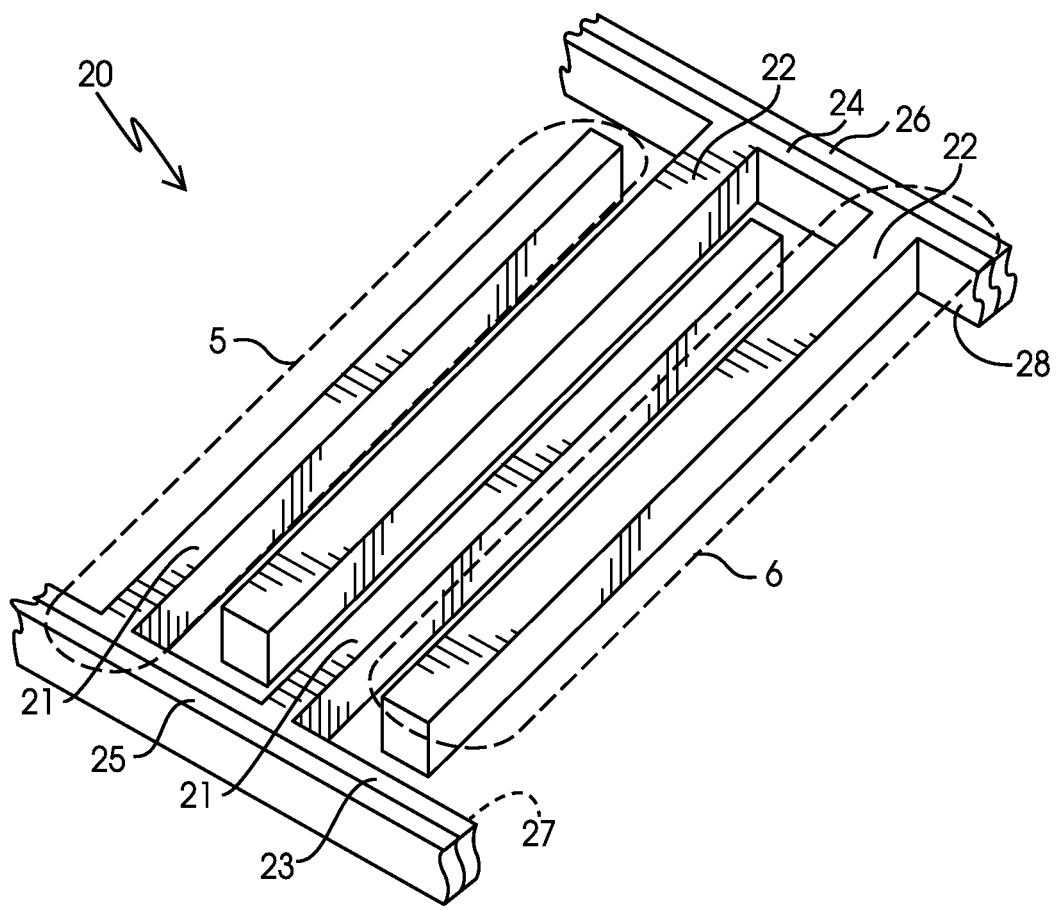
FIG. 4 is a fragmentary perspective view of a subassembly of the electrode structure of FIG. 2.

Referring now to FIG. 4, each negative electrode 21 (i.e., each member) of the population of negative electrodes extends from inner surface 27 of negative electrode bus 23 and each positive electrode 22 (i.e., each member) of the population of positive electrodes extends from inner surface 28 of positive electrode bus 24 with inner surfaces 27, 28 facing or opposing each other. As previously noted, negative electrode bus 23 comprises an electrically conductive material electrically connecting each member 21 of the negative electrode population to other members of the negative electrode population and to negative electrode tab extension 25 (see FIG. 2). Similarly, positive electrode bus 24 comprises an electrically conductive material electrically connecting each member 22 of the positive electrode population to each other and to positive electrode tab extension 26.

Referring now to FIG. 5, each of the negative electrode population members 21 has a bottom 31 proximate inner surface 27 of negative electrode bus 23, a top 33 distal to inner surface 27 and a length $L_{NE}$ defined by the distance between bottom 31 and top 33. Length $L_{NE}$ is measured in a direction from inner surface 27 of negative electrode bus 23 with the direction of measurement, in a preferred embodiment, being substantially perpendicular to the direction of progression of the series of interdigitated electrodes. In the context of the X-Y-Z coordinate system depicted in FIG. 2, length $L_{NE}$ is measured along the "X" axis (and perpendicular to direction D). In certain embodiments the negative electrode population members will have straight sides (i.e., each of the sides extending between bottom 31 and top 33 is planar). In other embodiments, the negative electrode population members will have sides that are polygonal or even curved (e.g., the sides extending between bottom 31 and top 33 may be sinusoidal). In each such embodiment, length $L_{NE}$ is the straight-line distance between bottom 31 and top 33.

Referring now to FIG. 6, each of the positive electrode population members 22 has a bottom 32 proximate inner surface 28 of positive electrode bus 24, a top 34 distal to positive electrode substrate surface 26 and a length $L_{PE}$ defined by the distance between bottom 32 and top 34. Length $L_{PE}$ is measured in a direction from inner surface 28 of positive electrode bus 24 with the direction of measurement, in a preferred embodiment, being substantially perpendicular to the direction of progression of the series of interdigitated electrodes. In the context of the X-Y-Z coordinate system depicted in FIG. 2, in a preferred embodiment Length $L_{PE}$ is measured along the "X" axis (and perpendicular to direction D). In certain embodiments the positive electrode population members will have straight sides (i.e., each of the sides extending between bottom 32 and top 34 is planar). In other embodiments, the positive electrode population members will have sides that are polygonal or even curved (e.g., the sides extending between bottom 32 and top 34 may be sinusoidal). In each such embodiment, length $L_{PE}$ is the straight-line distance between bottom 32 and top 34.

Figure 7:
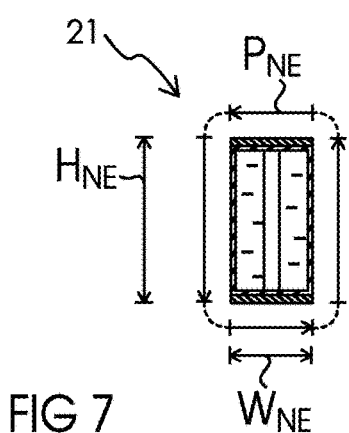
FIG. 7 is a cross-section of a subassembly of the electrode structure taken in the plane containing line 7-7 of FIG. 5.

Referring now to FIG. 7, a cross-section of each of the negative electrode population members 21 (i.e., a cross-section taken in a direction that is perpendicular to the direction in which the length, $L_{NE}$, is measured) has a width $W_{NE}$, a height $H_{NE}$ and a perimeter $P_{NE}$. In this embodiment, the cross-section of the negative electrode population members is rectangular and the perimeter $P_{NE}$ has a value that is equal to $2W_{NE}+2H_{NE}$. In addition, each of the negative electrode population members 21 has a length $L_{NE}$ that is greater than its width $W_{NB}$ and its height $H_{NB}$; stated differently, the length is the greatest dimension of each member of the negative electrode population. The width $W_{NE}$ and height $H_{NE}$ will vary depending upon the energy storage device and its intended use, but in many embodiments will each be within the range of about 0.01 mm to about 5 mm. For example, in one embodiment, width $W_{NE}$ and height $H_{NE}$ will each have a value in the range of about 0.025 mm to about 2 mm. By way of further example, in one embodiment, width $W_{NE}$ and height $H_{NE}$ will each have a value in the range of about 0.05 mm to about 1 mm. In general, $L_{NE}$ (see FIG. 5) will be substantially greater than each of $W_{NE}$ and $H_{NE}$; for example, in one embodiment, the ratio of $L_{NE}$ to each of $W_{NE}$ and $H_{NE}$ is at least 5:1, respectively (that is, the ratio of $L_{NE}$ to $W_{NE}$ is at least 5:1, respectively and the ratio of $L_{NE}$ to $H_{NE}$ is at least 5:1, respectively). By way of further example, in one embodiment the ratio of $L_{NE}$ to each of $W_{NE}$ and $H_{NE}$ is at least 10:1. By way of further example, in one embodiment, the ratio of $L_{NE}$ to each of $W_{NE}$ and $H_{NE}$ is at least 15:1. By way of further example, in one embodiment, the ratio of $L_{NE}$ to each of $W_{NE}$ and $H_{NE}$ is at least 20:1. Additionally, it is generally preferred that $L_{NE}$ be substantially greater than the perimeter $P_{NE}$; for example, in one embodiment, the ratio of $L_{NE}$ to $P_{NE}$ is at least 1.25:1, respectively. By way of further example, in one embodiment the ratio of $L_{NE}$ to $P_{NE}$ is at least 2.5:1, respectively. By way of further example, in one embodiment, the ratio of $L_{NE}$ to $P_{NE}$ is at least 3.75:1, respectively. Additionally, the ratio of $H_{NE}$ to $W_{NE}$ will generally be at least 0.4:1, respectively. For example, in one embodiment, the ratio of $H_{NE}$ to $W_{NE}$ will be at least 2:1, respectively. By way of further example, in one embodiment the ratio of $H_{NE}$ to $W_{NE}$ will be at least 10:1, respectively. By way of further example, in one embodiment the ratio of $H_{NE}$ to $W_{NE}$ will be at least 20:1, respectively. Typically, however, the ratio of $H_{NE}$ to $W_{NE}$ will generally be less than 1,000:1, respectively. For example, in one embodiment the ratio of $H_{NE}$ to $W_{NE}$ will be less than 500:1, respectively. By way of further example, in one embodiment the ratio of $H_{NE}$ to $W_{NE}$ will be less than 100:1, respectively. By way of further example, in one embodiment the ratio of $H_{NE}$ to $W_{NE}$ will be less than 10:1, respectively. By way of further example, in one embodiment the ratio of $H_{NE}$ to $W_{NE}$ will be in the range of about 2:1 to about 100:1, respectively. In the context of the X-Y-Z coordinate system depicted in FIG. 2, length $L_{NE}$ is measured along the "X" axis (and perpendicular to direction D), $W_{NE}$ is measured along the "Y" axis, and $H_{NE}$ is measured along the "Z" axis.

In the embodiment illustrated in FIG. 7, negative electrode population members 21 have a constant width $W_{NE}$ and a constant height $H_{NE}$ as a function of length. In other embodiments, the negative electrode population members 21 may have a width $W_{NE}$ or height $H_{NE}$ that varies as a function of position along the negative electrode length or the negative electrode population members may have a cross-section (taken in a plane that is normal to the length direction) that is other than rectangular. In such other embodiments, width $W_{NE}$ and height $H_{NE}$ refer to the maximum width and the maximum height of a projection of the negative electrode population members 21 in a plane that is normal to the length direction of the negative electrode population members 21. Stated differently, width $W_{NE}$ and height $H_{NE}$ correspond to the lengths of two adjacent sides of an imaginary rectangle lying in the plane that has the smallest dimensions but yet contains all of the points of the projection of the negative electrode population members.

Figure 8:
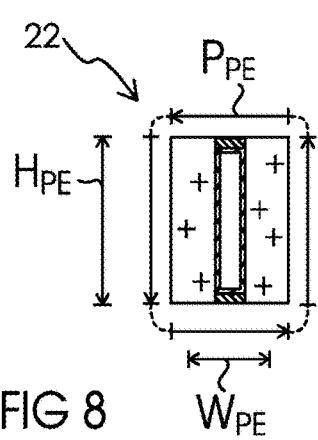
FIG. 8 is a cross-section of a subassembly of the electrode structure taken in the plane containing line 8-8 of FIG. 6.

Referring now to FIG. 8, a cross-section of each of the positive electrode population members 21 (i.e., a cross-section taken in a direction that is perpendicular to the direction in which the length, $L_{PE}$, is measured) has a width $W_{PE}$, a height $H_{PE}$ and a perimeter $P_{PE}$. In this embodiment, the cross-section of the positive electrode population members is rectangular and the perimeter $P_{PE}$ has a value that is equal to $2W_{PE}+2H_{PE}$. In addition, each of the positive electrode population members 22 has a length $L_{PE}$ that is greater than its width $W_{PB}$ and its height $H_{PB}$; stated differently, the length is the greatest dimension of each member of the positive electrode population. The width $W_{PE}$ and height $H_{PE}$ will vary depending upon the energy storage device and its intended use, but in many embodiments will each be within the range of about 0.01 mm to about 5 mm. For example, in one embodiment, width $W_{PE}$ and height $H_{PE}$ will each have a value in the range of about 0.025 mm to about 2 mm. By way of further example, in one embodiment, width $W_{PE}$ and height $H_{PE}$ will each have a value in the range of about 0.05 mm to about 1 mm. In general, $L_{PE}$ (see FIG. 6) will be substantially greater than each of $W_{PE}$ and $H_{PE}$; for example, in one embodiment, the ratio of $L_{PE}$ to each of $W_{PE}$ and $H_{PE}$ is at least 5:1, respectively (that is, the ratio of $L_{PE}$ to $W_{PE}$ is at least 5:1, respectively and the ratio of $L_{PE}$ to $H_{PE}$ is at least 5:1, respectively). By way of further example, in one embodiment the ratio of $L_{PE}$ to each of $W_{PE}$ and $H_{PE}$ is at least 10:1. By way of further example, in one embodiment, the ratio of $L_{PE}$ to each of $W_{PE}$ and $H_{PE}$ is at least 15:1. By way of further example, in one embodiment, the ratio of $L_{PE}$ to each of $W_{PE}$ and $H_{PE}$ is at least 20:1. Additionally, it is generally preferred that $L_{PE}$ be substantially greater than the perimeter $P_{PE}$; for example, in one embodiment, the ratio of $L_{PE}$ to $P_{PE}$ is at least 1.25:1, respectively. By way of further example, in one embodiment the ratio of $L_{PE}$ to $P_{PE}$ is at least 2.5:1, respectively. By way of further example, in one embodiment, the ratio of $L_{PE}$ to $P_{PE}$ is at least 3.75:1, respectively. Additionally, the ratio of $H_{PE}$ to $W_{PE}$ will generally be at least 0.4:1, respectively. For example, in one embodiment, the ratio of $H_{PE}$ to $W_{PE}$ will be at least 2:1, respectively. By way of further example, in one embodiment the ratio of $H_{PE}$ to $W_{PE}$ will be at least 10:1, respectively. By way of further example, in one embodiment the ratio of $H_{PE}$ to $W_{PE}$ will be at least 20:1, respectively. Typically, however, the ratio of $H_{PE}$ to $W_{PE}$ will generally be less than 1,000:1, respectively. For example, in one embodiment the ratio of $H_{PE}$ to $W_{PE}$ will be less than 500:1, respectively. By way of further example, in one embodiment the ratio of $H_{PE}$ to $W_{PE}$ will be less than 100:1, respectively. By way of further example, in one embodiment the ratio of $H_{PE}$ to $W_{PE}$ will be less than 10:1, respectively. By way of further example, in one embodiment the ratio of $H_{PE}$ to $W_{PE}$ will be in the range of about 2:1 to about 100:1, respectively. In the context of the X-Y-Z coordinate system depicted in FIG. 2, in a preferred embodiment length $L_{PE}$ is measured along the "X" axis (and perpendicular to direction D), $W_{PE}$ is measured along the "Y" axis, and $H_{PE}$ is measured along the "Z" axis.

In the embodiment illustrated in FIG. 9, positive electrode population members 22 have a constant width $W_{PE}$ and a constant height $H_{PE}$ as a function of their length. In other embodiments, the positive electrode population members 22 may have a width $W_{PE}$ or height $H_{PE}$ that varies as a function of position along the positive electrode length or the positive electrode population members may have a cross-section (taken in a plane that is normal to the length direction) that is other than rectangular. In such other embodiments, width $W_{PE}$ and height $H_{PE}$ refer to the maximum width and the maximum height of a projection of the positive electrode population members 22 in a plane that is normal to the length direction of the positive electrode population members 22. Stated differently, width $W_{PE}$ and height $H_{PE}$ correspond to the lengths of two adjacent sides of an imaginary rectangle lying in the plane that has the smallest dimensions but yet contains all of the points of the projection of the positive electrode bus.

Referring again to FIGS. 2 and 5-8, the members of the population of positive electrodes 22 and the members of the population of negative electrodes 23 each collectively have a surface area that exceeds the geometrical footprint of the positive and negative electrode buses (or other support structure), supporting the respective electrodes. Preferably, the members of the population of positive electrodes 22 and the members of the population of negative electrodes 23 each collectively have a surface area that exceeds the geometrical footprint of the positive and negative electrode buses (or other support structure) supporting the respective electrodes by a factor of 1.5, a factor of 2, a factor of 2.5 or even a factor of 3 or more. For example, the geometrical footprint of the population of negative or positive electrodes having "N" members may be determined according to the following equation:

Negative Electrode Geometric Footprint=$(N*L_{NE}*(2*H_{NE}+W_{NE}))$ and the geometrical footprint of the population of positive electrodes having "N" members may be determined according to the following equation:

Positive Electrode Geometric Footprint=$(N*L_{PE}*(2*H_{PE}+W_{PE}))$ wherein $L_{NE}$, $H_{NE}$, $W_{NE}$, $L_{PE}$, $H_{PE}$, and $W_{PE}$ are the length, width and height of the negative and positive electrode population members as previously described.

Referring now to FIG. 9, negative electrode backbone 51, negative electrode active material layer 49, negative electrode current collector layer 47 and supplemental negative electrode current collector layers 47A, 47B preferably extend a majority of the distance from bottom 31 to top 33 of each member 21 of the negative electrode population. Supplemental negative electrode current collectors may be incorporated into the negative electrode population members to provide additional electrical conductance. In certain embodiments, the supplemental negative electrode current collector has an electrical conductance that exceeds the electrical conductance of the negative electrode current collector by a factor of at least 2; in certain embodiments, the electrical conductance of the supplemental negative electrode current collector exceeds the electrical conductance of the negative electrode current collector by a factor of at least 5 or even 10. Advantageously, the additional electrical conductance provided by the supplemental negative electrode current collector allows the overall current collector weight and volume requirement of the negative electrode current collector layer 47 to be reduced. Additionally, when the negative electrode current collector layer is an ionically permeable current collector (as described more fully elsewhere herein), the supplemental negative electrode current collector may carry the majority of the current along the electrode length $L_{NE}$ and the negative electrode current collector layer can function to primarily collect the current from the electrode and provide it to the supplemental negative electrode current collector. This in turn reduces the electronic conductance required from the ionically permeable current collector layer, and allows for the ability to design the ionically permeable layer to have a lower electronic conductivity and higher ionic conductivity for better cell performance.

In some embodiments, the supplemental negative electrode current collector can provide a means for blocking the charge/discharge reactions at certain locations along the electrode. Referring now to FIG. 3, supplemental current collectors 47A, 47B can be designed such that the ionic conductivity of this layer is essentially zero, which inhibits the charge/discharge reaction on the electrode that is directly under the supplemental current collector.

In one embodiment the negative electrode current conductor layer 47 comprised by each member 21 of the negative electrode population has a length $L_{NC}$ that is at least 50% of the length $L_{NE}$ of the member comprising such negative electrode current collector. By way of further example, in one embodiment the negative electrode current conductor layer 47 comprised by each member 21 of the negative electrode population has a length $L_{NC}$ that is at least 60% of the length $L_{NE}$ of the member comprising such negative electrode current collector. By way of further example, in one embodiment the negative electrode current conductor layer 47 comprised by each member 21 of the negative electrode population has a length $L_{NC}$ that is at least 70% of the length $L_{NE}$ of the member comprising such negative electrode current collector. By way of further example, in one embodiment the negative electrode current conductor layer 47 comprised by each member 21 of the negative electrode population has a length $L_{NC}$ that is at least 80% of the length $L_{NE}$ of the member comprising such negative electrode current collector. By way of further example, in one embodiment the negative electrode current conductor layer 47 comprised by each member 21 of the negative electrode population has a length $L_{NC}$ that is at least 90% of the length $L_{NE}$ of the member comprising such negative electrode current collector. In each of the foregoing embodiments, the supplemental negative electrode current collector layers 47A, 47B independently have a length (measured in the same direction as the length $L_{NC}$) that is the same as, a substantial fraction of (e.g., at least 60%, 70%, 80% or even 90% of the length $L_{NC}$ of the negative electrode current collector layer 47. Alternatively, in each of the foregoing embodiments, the supplemental negative electrode current collector layers 47A, 47B independently have a length (measured in the same direction as the length $L_{NC}$)

that is less than a substantial fraction of (e.g., less than 40%, 30%, 20% or even 10% of the length $L_{NC}$ of the negative electrode current collector layer 47. The length $L_{NE}$ of each of the members 21 of the negative electrode population will vary depending upon the energy storage device and its intended use, but in many embodiments will be within the range of about 5 mm to about 500 mm. For example, in one embodiment, length $L_{NE}$ for each of member 21 will be within the range of about 10 mm to about 250 mm. By way of further example, in one embodiment, length $L_{NE}$ for each of member 21 will be in the range of about 25 mm to about 100 mm.

Referring now to FIG. 10, positive electrode backbone 52, positive electrode active material layer 50, and positive electrode current collector layer 48 and supplemental positive electrode current collector layers 48A, 48B preferably extend a majority of the distance from bottom 32 to top 34 of each member 22 of the negative electrode population. Supplemental positive electrode current collectors may be incorporated into the positive electrode population members to provide additional electrical conductance. In certain embodiments, the supplemental positive electrode current collector has an electrical conductance that exceeds the electrical conductance of the positive electrode current collector by a factor of at least 2; in certain embodiments, the electrical conductance of the supplemental positive electrode current collector exceeds the electrical conductance of the positive electrode current collector by a factor of at least 5 or even 10. Advantageously, the additional electrical conductance provided by the supplemental positive electrode current collector allows the overall current collector weight and volume requirement of the positive electrode current collector layer 48 to be reduced. Additionally, when the positive electrode current collector layer is an ionically permeable current collector (as described more fully elsewhere herein), the supplemental positive electrode current collector may carry the majority of the current along the electrode length $L_{PE}$ and the positive electrode current collector layer can function to primarily collect the current from the electrode and provide it to the supplemental positive electrode current collector. This in turn reduces the electronic conductance required from the ionically permeable current collector layer, and allows for the ability to design the ionically permeable layer to have a lower electronic conductivity and higher ionic conductivity for better cell performance.

In some embodiments, the supplemental positive electrode current collector can provide a means for blocking the charge/discharge reactions at certain locations along the electrode. Referring now to FIG. 3, supplemental current collectors 48A, 48B can be designed such that the ionic conductivity of this layer is essentially zero, which inhibits the charge/discharge reaction on the electrode that is directly under the supplemental current collector.

For example, in one embodiment the positive electrode current conductor layer 48 comprised by each member 22 of the positive electrode population has a length $L_{PC}$ that is at least 50% of the length $L_{PE}$ of the member comprising such positive electrode current collector. By way of further example, in one embodiment the positive electrode current conductor layer 48 comprised by each member 22 of the positive electrode population has a length $L_{PC}$ that is at least 60% of the length $L_{PE}$ of the member comprising such positive electrode current collector. By way of further example, in one embodiment the positive electrode current conductor layer 48 comprised by each member 22 of the positive electrode population has a length $L_{PC}$ that is at least 70% of the length $L_{PE}$ of the member comprising such positive electrode current collector. By way of further example, in one embodiment the positive electrode current conductor layer 48 comprised by each member 22 of the positive electrode population has a length $L_{PC}$ that is at least 80% of the length $L_{PE}$ of the member comprising such positive electrode current collector. By way of further example, in one embodiment the positive electrode current conductor layer 48 comprised by each member 22 of the positive electrode population has a length $L_{PC}$ that is at least 90% of the length $L_{PE}$ of the member comprising such positive electrode current collector. In each of the foregoing embodiments, the supplemental positive electrode current collector layers 48A, 48B independently have a length (measured in the same direction as the length $L_{PC}$) that is the same as, a substantial fraction of (e.g., at least 60%, 70%, 80% or even 90% of the length $L_{PC}$ of the positive electrode current collector layer 48. Alternatively, in each of the foregoing embodiments, the supplemental positive electrode current collector layers 48A, 48B independently have a length (measured in the same direction as the length $L_{PC}$) that is less than a substantial fraction of (e.g., less than 40%, 30%, 20% or even 10% of the length $L_{PC}$ of the positive electrode current collector layer 48. The length $L_{PE}$ of each of the members 22 of the positive electrode population will vary depending upon the energy storage device and its intended use, but in many embodiments will be within the range of about 5 mm to about 500 mm. For example, in one embodiment, length $L_{PE}$ for each of member 21 will be within the range of about 10 mm to about 250 mm. By way of further example, in one embodiment, length $L_{PE}$ for each of member 21 will be in the range of about 25 mm to about 100 mm.

Referring now to FIGS. 3 and 7, negative electrode backbone 51 provides mechanical stability for negative electrode active material layer 49 located on the lateral surfaces of negative electrode backbone 51 facing the positive electrode(s). Typically, negative electrode backbone 51 will have a thickness (when measured in the same direction as width $W_{NE}$ of the negative electrode) of at least 1 micrometer. Negative electrode backbone 51 may be substantially thicker, but typically will not have a thickness in excess of 100 micrometers; greater thickness are feasible but may negatively impact energy density. For example, in one embodiment, negative electrode backbone 51 will have a thickness of about 1 to about 50 micrometers. In general, negative electrode backbone 51 will have a height (when measured in the same direction as height $H_{NE}$ of the negative electrode) of at least about 50 micrometers, more typically at least about 100 micrometers. In general, however, negative electrode backbone 51 will typically have a height of no more than about 10,000 micrometers, and more typically no more than about 5,000 micrometers. By way of example, in one embodiment, negative electrode backbone 51 will have a thickness of about 5 to about 50 micrometers and a height of about 50 to about 5,000 micrometers. By way of further example, in one embodiment, negative electrode backbone 51 will have a thickness of about 5 to about 20 micrometers and a height of about 100 to about 1,000 micrometers. By way of further example, in one embodiment, negative electrode backbone 51 will have a thickness of about 5 to about 20 micrometers and a height of about 100 to about 2,000 micrometers.

Depending upon the application, negative electrode backbone 51 may be electrically conductive or insulating. For example, in one embodiment the negative electrode backbone 51 may be electrically conductive and may comprise or even constitute a current collector for negative electrode active material layer 49. In one such embodiment, the negative electrode backbone comprises a current collector having a conductivity of at least about $10^3$ Siemens/cm. By way of further example, in one such embodiment, the negative electrode backbone comprises a current collector having a conductivity of at least about $10^4$ Siemens/cm. By way of further example, in one such embodiment, the negative electrode backbone comprises a current collector having a conductivity of at least about $10^5$ Siemens/cm. In other embodiments, negative electrode backbone 51 is relatively nonconductive. For example, in one embodiment, negative electrode backbone 51 has an electrical conductivity of less than 10 Siemens/cm. By way of further example in one embodiment, negative electrode backbone 51 has an electrical conductivity of less than 1 Siemens/cm. By way of further example in one embodiment, negative electrode backbone 51 has an electrical conductivity of less than $10^{-1}$ Siemens/cm.

Negative electrode backbone 51 may comprise any material that may be shaped, such as metals, semiconductors, organics, ceramics, and glasses. Presently preferred materials include semiconductor materials such as silicon and germanium. Alternatively, however, carbon-based organic materials or metals, such as aluminum, copper, nickel, cobalt, titanium, and tungsten, may also be incorporated into negative electrode backbones. In one exemplary embodiment, negative electrode backbone 51 comprises silicon. The silicon, for example, may be single crystal silicon, polycrystalline silicon, amorphous silicon or a combination thereof.

The layer of negative electrode active material 49 on each of the lateral surfaces of negative electrode backbone 51 will have a thickness (when measured in the same direction as width $W_{NE}$ of the negative electrode) of at least 1 micrometer. In general, however, negative electrode active material layer 49 will typically have a thickness (i.e., the thickness of the layer between negative electrode backbone 51 and current collector layer 47 on one side of the negative electrode backbone 51) that does not exceed 200 micrometers. For example, in one embodiment, negative electrode active material layer 49 will have a thickness of about 1 to about 100 micrometers. By way of further example, in one embodiment, negative electrode active material layer 49 will have a thickness of about 2 to about 75 micrometers. By way of further example, in one embodiment, negative electrode active material layer 49 will have a thickness of about 10 to about 100 micrometers. By way of further example, in one embodiment, negative electrode active material layer 49 will have a thickness of about 5 to about 50 micrometers. Additionally, the layer of negative electrode active material 49 on each of the lateral surfaces of negative electrode backbone 51 will have a height (when measured in a direction corresponding to the height $H_{NE}$ of the negative electrode as illustrated in FIG. 5) of at least about 50 micrometers, more typically at least about 100 micrometers. In general, however, negative electrode active material layer 49 will typically have a height of no more than about 10,000 micrometers, and more typically no more than about 7,500 micrometers. By way of example, in one embodiment, negative electrode active material layer 49 will have a thickness of about 1 to about 200 micrometers and a height of about 50 to about 7,500 micrometers. By way of further example, in one embodiment, negative electrode active material layer 49 will have a thickness of about 1 to about 50 micrometers and a height of about 100 to about 1,000 micrometers. By way of further example, in one embodiment, negative electrode active material layer 49 will have a thickness of about 5 to about 20 micrometers and a height of about 100 to about 1,000 micrometers. By way of further example, in one embodiment, negative electrode active material layer 49 will have a thickness of about 10 to about 100 micrometers and a height of about 100 to about 1,000 micrometers. By way of further example, in one embodiment, negative electrode active material layer 49 will have a thickness of about 5 to about 50 micrometers and a height of about 100 to about 1,000 micrometers.

Negative electrode active material layer 49 may comprise a negative electrode active material capable of absorbing and releasing a carrier ion such as lithium, sodium, potassium, calcium or magnesium ions. Such materials include carbon materials such as graphite and soft or hard carbons, or any of a range of metals, semi-metals, alloys, oxides and compounds capable of forming an alloy with lithium. Specific examples of the metals or semi-metals capable of constituting the anode material include tin, lead, magnesium, aluminum, boron, gallium, silicon, indium, zirconium, germanium, bismuth, cadmium, antimony, silver, zinc, arsenic, hafnium, yttrium, and palladium. In one exemplary embodiment, Negative electrode active material layer 49 comprises aluminum, tin, or silicon, or an oxide thereof, a nitride thereof, a fluoride thereof, or other alloy thereof. In another exemplary embodiment, Negative electrode active material layer 49 comprises silicon or an alloy thereof. In each of the embodiments and examples recited in this paragraph, the negative electrode active material layer 49 may be a particulate agglomerate electrode or a monolithic electrode.

In one embodiment, negative electrode active material layer 49 is microstructured to provide a significant void volume fraction to accommodate volume expansion and contraction as lithium ions (or other carrier ions) are incorporated into or leave the negative electrode active material layer 49 during charging and discharging processes. In general, the void volume fraction of the negative electrode active material layer is at least 0.1. Typically, however, the void volume fraction of the negative electrode active material layer is not greater than 0.8. For example, in one embodiment, the void volume fraction of the negative electrode active material layer is about 0.15 to about 0.75. By way of the further example, in one embodiment, the void volume fraction of the negative electrode active material layer is about 0.2 to about 0.7. By way of the further example, in one embodiment, the void volume fraction of the negative electrode active material layer is about 0.25 to about 0.6.

Depending upon the composition of the microstructured negative electrode active material layer and the method of its formation, the microstructured negative electrode active material layer may comprise macroporous, microporous or mesoporous material layers or a combination thereof such as a combination of microporous and mesoporous or a combination of mesoporous and macroporous. Microporous material is typically characterized by a pore dimension of less than 10 nm, a wall dimension of less than 10 nm, a pore depth of 1-50 micrometers, and a pore morphology that is generally characterized by a "spongy" and irregular appearance, walls that are not smooth and branched pores. Mesoporous material is typically characterized by a pore dimension of 10-50 nm, a wall dimension of 10-50 nm, a pore depth of 1-100 micrometers, and a pore morphology that is generally characterized by branched pores that are somewhat well defined or dendritic pores. Macroporous material is typically characterized by a pore dimension of greater than 50 nm, a wall dimension of greater than 50 nm, a pore depth of 1-500 micrometers, and a pore morphology that may be varied, straight, branched or dendritic, and smooth or rough-walled. Additionally, the void volume may comprise open or closed voids, or a combination thereof. In one embodiment, the void volume comprises open voids, that is, the negative electrode active material layer contains voids having openings at the front surface of the negative electrode active material layer (that is, the surface facing the separator and the positive electrode active material layer) through which lithium ions (or other carrier ions) can enter or leave the negative electrode active material layer; for example, lithium ions may enter the negative electrode active material layer through the void openings after leaving the positive electrode active material layer. In another embodiment, the void volume comprises closed voids, that is, the negative electrode active material layer contains voids that are enclosed by negative electrode active material. In general, open voids can provide greater interfacial surface area for the carrier ions whereas closed voids tend to be less susceptible to solid electrolyte interface ("SEI") while each provides room for expansion of the negative electrode active material layer upon the entry of carrier ions. In certain embodiments, therefore, it is preferred that the negative electrode active material layer comprise a combination of open and closed voids.

In one embodiment, negative electrode active material layer 49 comprises porous aluminum, tin or silicon or an alloy thereof. Porous silicon layers may be formed, for example, by anodization, by etching (e.g., by depositing precious metals such as gold, platinum, silver or gold/palladium on the (100) surface of single crystal silicon and etching the surface with a mixture of hydrofluoric acid and hydrogen peroxide), or by other methods known in the art such as patterned chemical etching. Additionally, the porous negative electrode active material layer will generally have a porosity fraction of at least about 0.1 but less than 0.8 and have a thickness of about 1 to about 100 micrometers. For example, in one embodiment negative electrode active material layer 49 comprises porous silicon, has a thickness of about 5 to about 100 micrometers, and has a porosity fraction of about 0.15 to about 0.75. By way of further example, in one embodiment, negative electrode active material layer 49 comprises porous silicon, has a thickness of about 10 to about 80 micrometers, and has a porosity fraction of about 0.15 to about 0.7. By way of further example, in one such embodiment, negative electrode active material layer 49 comprises porous silicon, has a thickness of about 20 to about 50 micrometers, and has a porosity fraction of about 0.25 to about 0.6. By way of further example, in one embodiment negative electrode active material layer 49 comprises a porous silicon alloy (such as nickel silicide), has a thickness of about 5 to about 100 micrometers, and has a porosity fraction of about 0.15 to about 0.75.

In another embodiment, negative electrode active material layer 49 comprises fibers of aluminum, tin or silicon, or an alloy thereof. Individual fibers may have a diameter (thickness dimension) of about 5 nm to about 10,000 nm and a length generally corresponding to the thickness of the negative electrode active material layer 49. Fibers (nanowires) of silicon may be formed, for example, by chemical vapor deposition or other techniques known in the art such as vapor liquid solid (VLS) growth and solid liquid solid (SLS) growth. Additionally, the negative electrode active material layer 49 will generally have a porosity fraction of at least about 0.1 but less than 0.8 and have a thickness of about 1 to about 200 micrometers. For example, in one embodiment negative electrode active material layer 49 comprises silicon nanowires, has a thickness of about 5 to about 100 micrometers, and has a porosity fraction of about 0.15 to about 0.75. By way of further example, in one embodiment, negative electrode active material layer 49 comprises silicon nanowires, has a thickness of about 10 to about 80 micrometers, and has a porosity fraction of about 0.15 to about 0.7. By way of further example, in one such embodiment, negative electrode active material layer 49 comprises silicon nanowires, has a thickness of about 20 to about 50 micrometers, and has a porosity fraction of about 0.25 to about 0.6. By way of further example, in one embodiment negative electrode active material layer 49 comprises nanowires of a silicon alloy (such as nickel silicide), has a thickness of about 5 to about 100 micrometers, and has a porosity fraction of about 0.15 to about 0.75.

Although there may be significant fiber-to-fiber variation, nanowires of aluminum, tin or silicon (or an alloy thereof) have major axes (sometimes referred to as a central axis) which are predominantly perpendicular to the negative electrode backbone 51 (at the point of attachment of the nanowire to the negative electrode active material layer).

In another embodiment, negative electrode active material layer 49 comprises nanowires of silicon or an alloy thereof and porous silicon or an alloy thereof. In such embodiments, the negative electrode active material layer will generally have a porosity fraction of at least about 0.1 but less than 0.8 and have a thickness of about 1 to about 100 micrometers as previously described in connection with porous silicon and silicon nanowires.

Referring again to FIGS. 3 and 5, in one embodiment negative electrode current collector layer 47 comprises an ionically permeable conductor material that is both ionically and electrically conductive. Stated differently, the negative electrode current collector layer has a thickness, an electrical conductivity, and an ionic conductivity for carrier ions that facilitates the movement of carrier ions between an immediately adjacent active electrode material layer one side of the ionically permeable conductor layer and an immediately adjacent separator layer on the other side of the negative electrode current collector layer in an electrochemical stack. On a relative basis, the negative electrode current collector layer has an electrical conductance that is greater than its ionic conductance when there is an applied current to store energy in the device or an applied load to discharge the device. For example, the ratio of the electrical conductance to the ionic conductance (for carrier ions) of the negative electrode current collector layer will typically be at least 1,000:1, respectively, when there is an applied current to store energy in the device or an applied load to discharge the device. By way of further example, in one such embodiment, the ratio of the electrical conductance to the ionic conductance (for carrier ions) of the negative electrode current collector layer is at least 5,000:1, respectively, when there is an applied current to store energy in the device or an applied load to discharge the device. By way of further example, in one such embodiment, the ratio of the electrical conductance to the ionic conductance (for carrier ions) of the negative electrode current collector layer is at least 10,000:1, respectively, when there is an applied current to store energy in the device or an applied load to discharge the device. By way of further example, in one such embodiment, the ratio of the electrical conductance to the ionic conductance (for carrier ions) of the negative electrode current collector layer is at least 50,000:1, respectively, when there is an applied current to store energy in the device or an applied load to discharge the device. By way of further example, in one such embodiment, the ratio of the electrical conductance to the ionic conductance (for carrier ions) of the negative electrode current collector layer is at least 100,000:1, respectively, when there is an applied current to store energy in the device or an applied load to discharge the device.

In those embodiments in which negative electrode current collector layer 47 comprises an ionically permeable conductor material that is both ionically and electrically conductive, negative electrode current collector layer 47 may have an ionic conductance that is comparable to the ionic conductance of an adjacent separator layer when a current is applied to store energy in the device or a load is applied to discharge the device, such as when a secondary battery is charging or discharging. For example, in one embodiment negative electrode current collector layer 47 has an ionic conductance (for carrier ions) that is at least 50% of the ionic conductance of the separator layer (i.e., a ratio of 0.5:1, respectively) when there is an applied current to store energy in the device or an applied load to discharge the device. By way of further example, in some embodiments the ratio of the ionic conductance (for carrier ions) of negative electrode current collector layer 47 to the ionic conductance (for carrier ions) of the separator layer is at least 1:1 when there is an applied current to store energy in the device or an applied load to discharge the device. By way of further example, in some embodiments the ratio of the ionic conductance (for carrier ions) of negative electrode current collector layer 47 to the ionic conductance (for carrier ions) of the separator layer is at least 1.25:1 when there is an applied current to store energy in the device or an applied load to discharge the device. By way of further example, in some embodiments the ratio of the ionic conductance (for carrier ions) of negative electrode current collector layer 47 to the ionic conductance (for carrier ions) of the separator layer is at least 1.5:1 when there is an applied current to store energy in the device or an applied load to discharge the device. By way of further example, in some embodiments the ratio of the ionic conductance (for carrier ions) of negative electrode current collector layer 47 to the ionic conductance (for carrier ions) of the separator layer is at least 2:1 when there is an applied current to store energy in the device or an applied load to discharge the device.

In one embodiment, negative electrode current collector layer 47 also has an electrical conductance that is substantially greater than the electrical conductance of the negative electrode active material layer. For example, in one embodiment the ratio of the electrical conductance of negative electrode current collector layer 47 to the electrical conductance of the negative electrode active material layer is at least 100:1 when there is an applied current to store energy in the device or an applied load to discharge the device. By way of further example, in some embodiments the ratio of the electrical conductance of negative electrode current collector layer 47 to the electrical conductance of the negative electrode active material layer is at least 500:1 when there is an applied current to store energy in the device or an applied load to discharge the device. By way of further example, in some embodiments the ratio of the electrical conductance of negative electrode current collector layer 47 to the electrical conductance of the negative electrode active material layer is at least 1000:1 when there is an applied current to store energy in the device or an applied load to discharge the device. By way of further example, in some embodiments the ratio of the electrical conductance of negative electrode current collector layer 47 to the electrical conductance of the negative electrode active material layer is at least 5000:1 when there is an applied current to store energy in the device or an applied load to discharge the device. By way of further example, in some embodiments the ratio of the electrical conductance of negative electrode current collector layer 47 to the electrical conductance of the negative electrode active material layer is at least 10,000:1 when there is an applied current to store energy in the device or an applied load to discharge the device.

The thickness of negative electrode current collector layer 47 (i.e., the shortest distance between the separator and the negative electrode active material layer between which negative electrode current collector layer 47 is sandwiched) in this embodiment will depend upon the composition of the layer and the performance specifications for the electrochemical stack. In general, when a negative electrode current collector layer is an ionically permeable conductor layer, it will have a thickness of at least about 300 Angstroms. For example, in some embodiments it may have a thickness in the range of about 300-800 Angstroms. More typically, however, it will have a thickness greater than about 0.1 micrometers. In general, an ionically permeable conductor layer will have a thickness not greater than about 100 micrometers. Thus, for example, in one embodiment, negative electrode current collector layer 47 will have a thickness in the range of about 0.1 to about 10 micrometers. By way of further example, in some embodiments, negative electrode current collector layer 47 will have a thickness in the range of about 0.1 to about 5 micrometers. By way of further example, in some embodiments, negative electrode current collector layer 47 will have a thickness in the range of about 0.5 to about 3 micrometers. In general, it is preferred that the thickness of negative electrode current collector layer 47 be approximately uniform. For example, in one embodiment it is preferred that negative electrode current collector layer 47 have a thickness non-uniformity of less than about 25% wherein thickness non-uniformity is defined as the quantity of the maximum thickness of the layer minus the minimum thickness of the layer, divided by the average layer thickness. In certain embodiments, the thickness variation is even less. For example, in some embodiments negative electrode current collector layer 47 has a thickness non-uniformity of less than about 20%. By way of further example, in some embodiments negative electrode current collector layer 47 has a thickness non-uniformity of less than about 15%. In some embodiments the ionically permeable conductor layer has a thickness non-uniformity of less than about 10%.

In one preferred embodiment, negative electrode current collector layer 47 is an ionically permeable conductor layer comprising an electrically conductive component and an ion conductive component that contribute to the ionic permeability and electrical conductivity. Typically, the electrically conductive component will comprise a continuous electrically conductive material (such as a continuous metal or metal alloy) in the form of a mesh or patterned surface, a film, or composite material comprising the continuous electrically conductive material (such as a continuous metal or metal alloy). Additionally, the ion conductive component will typically comprise pores, e.g., interstices of a mesh, spaces between a patterned metal or metal alloy containing material layer, pores in a metal film, or a solid ion conductor having sufficient diffusivity for carrier ions. In certain embodiments, the ionically permeable conductor layer comprises a deposited porous material, an ion-transporting material, an ion-reactive material, a composite material, or a physically porous material. If porous, for example, the ionically permeable conductor layer may have a void fraction of at least about 0.25. In general, however, the void fraction will typically not exceed about 0.95. More typically, when the ionically permeable conductor layer is porous the void fraction may be in the range of about 0.25 to about 0.85. In some embodiments, for example, when the ionically permeable conductor layer is porous the void fraction may be in the range of about 0.35 to about 0.65.

Being positioned between the negative electrode active material layer and the separator, negative electrode current collector layer 47 may facilitate more uniform carrier ion transport by distributing current from the negative electrode current collector across the surface of the negative electrode active material layer. This, in turn, may facilitate more uniform insertion and extraction of carrier ions and thereby reduce stress in the negative electrode active material during cycling; since negative electrode current collector layer 47 distributes current to the surface of the negative electrode active material layer facing the separator, the reactivity of the negative electrode active material layer for carrier ions will be the greatest where the carrier ion concentration is the greatest.

Supplemental negative electrode current collector layers 47A and 47B may comprise any of the materials previously identified in connection with negative electrode current collector layer 47. Because supplemental negative electrode current collector layers 47A and 47B are not between the negative and positive electrode active material layers, they need not be ionically permeable to carrier ions. Thus, supplemental negative electrode current collector layers 47A, 47B may comprise any metal or other conductor conventionally used as a current collector material for negative electrodes such as carbon, cobalt, chromium, copper, nickel, titanium, or an alloy of one or more thereof. Additionally, in one embodiment, supplemental negative electrode current collector layers 47A, 47B independently have an electrical conductance that exceeds the electrical conductance of negative electrode current collector layer 47. For example, in one embodiment, at least one of supplemental negative electrode current collector layers 47A, 47B has an electrical conductance that is at least 200%, e.g., at least 1000%, of the electrical conductance of negative electrode current collector layer.

In an alternative embodiment, one or both of electrode current collector layers 47A, 47B is omitted from each member 21 of the population of negative electrodes. For example, in one such embodiment, each member 21 of the population of negative electrodes comprises electrode negative current collector layer 47 and supplemental negative current collector layer 47A but not supplemental negative current collector layer 47B. By way of further example, in one such embodiment, each member 21 of the population of negative electrodes comprises negative electrode current collector layer 47 and supplemental negative current collector layer 47B but not supplemental negative current collector layer 47A. By way of further example, in one such embodiment, each member 21 of the population of negative electrodes comprises negative electrode current collector layer 47 but neither supplemental negative current collector layer 47A nor supplemental negative current collector layer 47B.

In an alternative embodiment, the positions of the negative electrode current collector layer 47 and the negative electrode active material layer are reversed relative to their positions as depicted in FIGS. 3 and 6. Stated differently, in some embodiments, the negative electrode current collector layer 47 is positioned between the negative electrode backbone 51 and the negative electrode active material layer 49. In such embodiments, the negative electrode current collector layer may comprise any metal or other conductor conventionally used as a current collector material for negative electrodes such as carbon, cobalt, chromium, copper, nickel, titanium, or an alloy of one or more thereof. .as the only current collector. Additionally, in such alternative embodiments, one or both of supplemental negative electrode current collector layers 47A, 47B may be omitted from each member 21 of the population of negative electrodes and the negative electrode backbone 51 constitutes a negative electrode current collector.

Referring again to FIGS. 2 and 3, microporous separator layer 43 is positioned between each member 21 of the population of negative electrodes and each member 22 of the population of positive electrodes. Microporous separator layer 43 may comprise any of the porous materials conventionally used as secondary battery separators including, for example, microporous polyethylenes, polypropylenes, $TiO_2$-polymer composites, $SiO_2$, $Al_2O_3$, and the like (P. Arora and J. Zhang, "Battery Separators" Chemical Reviews 2004, 104, 4419-4462). Such materials may be deposited, for example, by electrophoretic deposition of a particulate separator material, slurry deposition (including spin or spray coating) of a particulate separator material, or sputter coating of an ionically conductive particulate separator material. Microporous separator layer 43 may have, for example, a thickness (the shortest distance separating adjacent members of the populations of negative and positive electrodes) of about 5 to 100 micrometers and a void fraction of about 0.25 to about 0.75.

In operation, the microporous separator layer 43 is preferably permeated with a non-aqueous electrolyte containing any non-aqueous electrolyte that is conventionally used for non-aqueous electrolyte secondary batteries. Typically, the non-aqueous electrolyte comprises a lithium salt dissolved in an organic solvent. Exemplary lithium salts include inorganic lithium salts such as $LiClO_4$, $LiBF_4$, $LiPF_6$, $LiAsF_6$, LiCl, and LiBr; and organic lithium salts such as $LiB(C_6H_5)_4$, $LiN(SO_2CF_3)_2$, $LiN(SO_2CF_3)_3$, $LiNSO_2CF_3$, $LiNSO_2CF_5$, $LiNSO_2C_4F_9$, $LiNSO_2C_5F_{11}$, $LiNSO_2C_6F_{13}$, and $LiNSO_2C_7F_{15}$. Exemplary organic solvents to dissolve the lithium salt include cyclic esters, chain esters, cyclic ethers, and chain ethers. Specific examples of the cyclic esters include propylene carbonate, butylene carbonate, γ-butyrolactone, vinylene carbonate, 2-methyl-γ-butyrolactone, acetyl-γ-butyrolactone, and γ-valerolactone. Specific examples of the chain esters include dimethyl carbonate, diethyl carbonate, dibutyl carbonate, dipropyl carbonate, methyl ethyl carbonate, methyl butyl carbonate, methyl propyl carbonate, ethyl butyl carbonate, ethyl propyl carbonate, butyl propyl carbonate, alkyl propionates, dialkyl malonates, and alkyl acetates. Specific examples of the cyclic ethers include tetrahydrofuran, alkyltetrahydrofurans, dialkyltetrahydrofurans, alkoxytetrahydrofurans, dialkoxytetrahydrofurans, 1,3-dioxolane, alkyl-1,3-dioxolanes, and 1,4-dioxolane. Specific examples of the chain ethers include 1,2-dimethoxyethane, 1,2-diethoxythane, diethyl ether, ethylene glycol dialkyl ethers, diethylene glycol dialkyl ethers, triethylene glycol dialkyl ethers, and tetraethylene glycol dialkyl ethers.

Referring now to FIGS. 3 and 7, positive electrode backbone 52 provides mechanical stability for positive electrode active material layer 50 located on the lateral surfaces of positive electrode backbone 52 facing the negative electrode(s) and for positive electrode current collector layer 48. Typically, positive electrode backbone 52 will have a thickness (when measured in the same direction as width $W_{PE}$ of the positive electrode) of at least 1 micrometer. Positive electrode backbone 52 may be substantially thicker, but generally will not have a thickness in excess of 100 micrometers. For example, in one embodiment, positive backbone 52 will have a thickness of about 1 to about 50 micrometers. In general, positive electrode backbone 52 will have a height $H_{PE}$ (when measured in the same direction as height $H_{NE}$ of the negative electrode) of at least about 50 micrometers, more typically at least about 100 micrometers. In general, however, positive electrode backbone 52 will typically have a height of no more than about 10,000 micrometers, and more typically no more than about 5,000 micrometers. By way of example, in one embodiment, positive electrode backbone 52 will have a thickness of about 5 to about 50 micrometers and a height of about 50 to about 5,000 micrometers. By way of further example, in one embodiment, positive electrode backbone 52 will have a thickness of about 5 to about 20 micrometers and a height of about 100 to about 1,000 micrometers. By way of further example, in one embodiment, positive electrode backbone 52 will have a thickness of about 5 to about 20 micrometers and a height of about 100 to about 2,000 micrometers.

Depending upon the application, positive electrode backbone 52 may be electrically conductive or insulating. For example, in one embodiment the positive electrode backbone 52 may be electrically conductive and may comprise a current collector for positive electrode active material layer 50. In one such embodiment, the positive electrode backbone comprises a current collector having a conductivity of at least about $10^3$ Siemens/cm. By way of further example, in one such embodiment, the positive electrode backbone comprises a current collector having a conductivity of at least about $10^4$ Siemens/cm. By way of further example, in one such embodiment, the positive electrode backbone comprises a current collector having a conductivity of at least about $10^5$ Siemens/cm. In other embodiments, positive electrode backbone anode backbone 52 is relatively non-conductive. For example, in one embodiment, positive electrode backbone 52 has an electrical conductivity of less than 10 Siemens/cm. By way of further example in one embodiment, positive electrode backbone 52 has an electrical conductivity of less than 1 Siemens/cm. By way of further example in one embodiment, positive electrode backbone 52 has an electrical conductivity of less than $10^{-1}$ Siemens/cm.

Positive electrode backbone 52 may comprise any material that may be shaped, such as metals, semiconductors, organics, ceramics, and glasses. Presently preferred materials include semiconductor materials such as silicon and germanium. Alternatively, however, carbon-based organic materials or metals, such as aluminum, copper, nickel, cobalt, titanium, and tungsten, may also be incorporated into positive electrode backbones. In one exemplary embodiment, positive electrode backbone 52 comprises silicon. The silicon, for example, may be single crystal silicon, polycrystalline silicon, amorphous silicon or a combination thereof.

Positive electrode active material layer 50 may comprise any of a range of cathode active materials, including mixtures of cathode active materials. For example, for a lithium-ion battery, positive electrode active material layer 50 may comprise a cathode material selected from transition metal oxides, transition metal sulfides, transition metal nitrides, lithium-transition metal oxides, lithium-transition metal sulfides, and lithium-transition metal nitrides may be selectively used. The transition metal elements of these transition metal oxides, transition metal sulfides, and transition metal nitrides can include metal elements having a d-shell or f-shell. Specific examples of such metal element are Sc, Y, lanthanoids, actinoids, Ti, Zr, Hf, V, Nb, Ta, Cr, Mo, W, Mn, Tc, Re, Fe, Ru, Os, Co, Rh, Ir, Ni, Pb, Pt, Cu, Ag, and Au. Additional cathode active materials include $LiCoO_2$, $LiNi_{0.5}Mn_{1.5}O_4$, $Li(Ni_xCo_yAl_z)O_2$, $LiFePO_4$, $Li_2MnO_4$, $V_2O_5$, molybdenum oxysulfides, and combinations thereof. The positive electrode active material layer may be deposited to form the positive electrode structure by any of a range of techniques including, for example, electrophoretic deposition, electrodeposition, co-deposition or slurry deposition. In one exemplary embodiment, one of the aforementioned positive electrode active materials, or a combination thereof, in particulate form is electrophoretically deposited. In another exemplary embodiment, a positive electrode active material such as $V_2O_5$ is electrodeposited. In another exemplary embodiment, one of the aforementioned positive electrode active materials, or a combination thereof, in particulate form is co-deposited in a conductive matrix such as polyaniline. In another exemplary embodiment, one of the aforementioned positive electrode active materials, or a combination thereof, in particulate form is slurry deposited.

Each member 22 of the population of positive electrodes further comprises a positive electrode current collector layer 48 which, in the embodiment illustrated in FIG. 3, overlies positive electrode backbone 52 (i.e., is disposed between the positive electrode backbone 52 and the positive electrode active material layer 50. Positive electrode current collector 48 may comprise any of the metals previously identified for the negative electrode current collector; for example, in one embodiment, positive electrode current collector 48 comprises aluminum, carbon, chromium, gold, nickel, NiP, palladium, platinum, rhodium, ruthenium, an alloy of silicon and nickel, titanium, or a combination thereof (see "Current collectors for positive electrodes of lithium-based batteries" by A. H. Whitehead and M. Schreiber, Journal of the Electrochemical Society, 152(11) A2105-A2113 (2005)). By way of further example, in one embodiment, positive electrode current collector 48 comprises gold or an alloy thereof such as gold silicide. By way of further example, in one embodiment, positive electrode current collector 48 comprises nickel or an alloy thereof such as nickel silicide.

Supplemental positive electrode current collector layers 48A and 48B may comprise any of the materials previously identified in connection with positive electrode current collector layer 48. Additionally, in one embodiment, at least one of supplemental positive electrode current collector layers 48A, 48B has an electrical conductance that exceeds the electrical conductance of positive electrode current collector layer 48. For example, in one embodiment, at least one of supplemental positive electrode current collector layers 48A, 48B has an electrical conductance that is at least 200-1,000% of the electrical conductance of positive electrode current collector layer.

In an alternative embodiment, one or both of positive electrode current collector layers 48A, 48B is omitted from each member 22 of the population of positive electrodes. For example, in one such embodiment, each member 22 of the population of positive electrodes comprises positive electrode current collector layer 48 and supplemental positive current collector layer 48A but not supplemental positive current collector layer 48B. By way of further example, in one such embodiment, each member 22 of the population of positive electrodes comprises positive electrode current collector layer 48 and supplemental positive current collector layer 48B but not supplemental positive current collector layer 48A. By way of further example, in one such embodiment, each member 22 of the population of positive electrodes comprises positive electrode current collector layer 48 but neither supplemental positive current collector layer 48A nor supplemental positive current collector layer 48B.

In an alternative embodiment, the positions of the positive electrode current collector layer and the positive electrode active material layer are reversed relative to their positions as depicted in FIGS. 3 and 6. Stated differently, in some embodiments, the positive electrode current collector layer is positioned between the separator layer and the positive electrode active material layer. In such embodiments, the positive electrode current collector for the immediately adjacent positive electrode active material layer comprises an ionically permeable conductor having a composition and construction as described in connection with the negative electrode current collector layer; that is, the positive electrode current collector layer comprises a layer of an ionically permeable conductor material that is both ionically and electrically conductive. In this embodiment, the positive electrode current collector layer has a thickness, an electrical conductivity, and an ionic conductivity for carrier ions that facilitates the movement of carrier ions between an immediately adjacent positive electrode active material layer on one side of the positive electrode current collector layer and an immediately adjacent separator layer on the other side of the positive electrode current collector layer in an electrochemical stack. On a relative basis in this embodiment, the positive electrode current collector layer has an electrical conductance that is greater than its ionic conductance when there is an applied current to store energy in the device or an applied load to discharge the device. For example, the ratio of the electrical conductance to the ionic conductance (for carrier ions) of the positive electrode current collector layer will typically be at least 1,000:1, respectively, when there is an applied current to store energy in the device or an applied load to discharge the device. By way of further example, in one such embodiment, the ratio of the electrical conductance to the ionic conductance (for carrier ions) of the positive electrode current collector layer is at least 5,000:1, respectively, when there is an applied current to store energy in the device or an applied load to discharge the device. By way of further example, in one such embodiment, the ratio of the electrical conductance to the ionic conductance (for carrier ions) of the positive electrode current collector layer is at least 10,000:1, respectively, when there is an applied current to store energy in the device or an applied load to discharge the device. By way of further example, in one such embodiment, the ratio of the electrical conductance to the ionic conductance (for carrier ions) of the positive electrode current collector layer is at least 50,000:1, respectively, when there is an applied current to store energy in the device or an applied load to discharge the device. By way of further example, in one such embodiment, the ratio of the electrical conductance to the ionic conductance (for carrier ions) of the positive electrode current collector layer is at least 100,000:1, respectively, when there is an applied current to store energy in the device or an applied load to discharge the device.

Referring again to FIGS. 2 and 4, negative electrode bus 23 and positive electrode bus 24 may constitute any of a wide range of electrically conductive materials. For example, negative electrode bus 23 and positive electrode bus 24 may independently comprise an electrically conductive ceramic, glass, polymer, semiconductor, or metal for electrically connecting the members of the negative and positive electrode populations to the negative and positive electrically conductive pathways 25, 26, respectively. By way of further example, in one embodiment, negative electrode bus 23 and positive electrode bus 24 each independently comprise an electrically conductive material such as silicon, carbon, carbon composites, metal silicides, and the like. Exemplary materials for the positive electrode bus include aluminum, carbon, chromium, gold, nickel, NiP, palladium, platinum, rhodium, ruthenium, an alloy of silicon and nickel, titanium, an alloy of one or more thereof, and combinations thereof. Exemplary materials for the negative electrode bus include copper, nickel, chromium, titanium, tungsten, cobalt, carbon, an alloy of one or more thereof, and combinations thereof. The materials for the positive and negative electrode bus may be deposited by any of a range of well-known, metal deposition processes such as evaporation, sputtering, electroless plating, immersion plating, electroplating and the like. In certain embodiments, the conductive portions of the positive and negative electrode buses may comprise the same material. In other embodiments, the conductive portions of the positive and negative electrode buses may comprise compositionally different materials. In certain embodiments, the positive and/or negative electrode bus comprises a non-conductive core partially or completely covered by a conductive material shell; additionally, in such embodiments in which the positive and negative electrode buses comprise a non-conductive core partially or completely covered by a conductive material shell, the non-conductive cores of the positive and negative electrode buses may have the same composition while the conductive shells are compositionally different.

Negative electrode tab 41 and negative electrode tab extension 25 and positive electrode tab 42 and positive electrode tab extension 42 may comprise any of a wide range of electrically conductive materials. For example, in one embodiment, negative electrode tab 41, negative electrode tab extension 25, positive electrode tab 42 and positive electrode tab extension 42 independently comprise an electrically conductive material such as silicon, carbon, carbon composites, metal silicides, and the like. Exemplary materials for the positive electrode tab and positive electrode tab extension include the same materials as those identified for the positive electrode bus and exemplary materials for the negative electrode tab and negative electrode tab extension include the same materials as those identified for the negative electrode bus.

Negative electrode tab 41, negative electrode tab extension 25, positive electrode tab 42 and positive electrode tab extension 26 may be attached to negative electrode bus 23 and positive electrode bus 24, respectively, by a range of techniques. Methods for attachment of the tabs, tab extensions, and the buses may include gluing, soldering, bonding, sintering, press contacting, brazing, thermal spraying joining, clamping or combinations thereof. Gluing may include joining the materials with conductive materials such as conducting epoxies, conducting elastomers, mixtures of insulating organic glue filled with conducting metals, such as nickel filled epoxy, carbon filled epoxy etc. Conductive pastes may be used to join the materials together and the joining strength could be tailored by temperature (sintering), light (UV curing, cross-linking), chemical curing (catalyst based cross linking). Bonding processes may include wire bonding, ribbon bonding, ultrasonic bonding. Welding processes may include ultrasonic welding, resistance welding, laser beam welding, electron beam welding, induction welding, and cold welding. Joining of these materials can also be performed by using a coating process such as a thermal spray coating such as plasma spraying, flame spraying, arc spraying, to join materials together. By way of example, a nickel or copper mesh can be joined onto a nickel bus using a thermal spray of nickel as a glue.

Referring again to FIGS. 2 and 3, the negative electrode backbone 51 and the positive electrode backbone 52 may be fabricated in any method known in the art for fabricating three-dimensional structures. For example, a silicon backbone for the positive electrode (cathode) and a silicon backbone for the negative electrode (anode) may be manufactured simultaneously by using a wafer that is bonded to a base by a temporary, permanent, or semi-permanent bond. Non-exhaustive methods of bonding a base to a wafer include, gluing using inorganic or organic gluing agents, anodic oxidation bonding, compression bonding, thermal bonding, and the like. Silicon-on-insulator wafers, anodic glass bonded wafers, temporary carrier mounted wafers, are examples of a base bonded on to the active substrate. Subsequently, the wafer can be patterned and the silicon can be removed in unwanted areas to leave behind structures that can act as the backbone for the electrodes. In some embodiments, the backbones may be manufactured in a negative fashion by removing materials from a planar substrate in unwanted areas by laser machining, electrical discharge machining, high precision machining, ablation, and drilling. In other embodiments, each backbone can individually or separately be created in a positive fashion by building up layers using methods like 3D printing, stencil printing and layering, gravure printing, injection molding, pressure molding and sintering, gel-casting and sintering, slurry-casting, tape-casting etc, with or without sintering, microforming, electroforming, etc. Other exemplary processes that may be used to make the backbones include growing pillars, rods, waves etc, using vacuum based deposition processes such as sputtering through a mask, evaporation, etc. Still further exemplary methods for manufacturing include the use of nanowire or nanostructure growth on a patterned base material.

Referring again to FIGS. 2 and 3, the negative electrode current collector 47 and the positive electrode current collector 48 may be fabricated by processes such as electrodeposition, electroless deposition, immersion deposition, physical vapor deposition, chemical vapor deposition, and the like. The positive electrode (cathode) and negative electrode (anode) current collectors may be simultaneously deposited, or sequentially fabricated using known patterning and metal deposition techniques.

Supplemental negative electrode current collector layers 47A, 47B and/or supplemental positive electrode current collector layers 48A, 48B may provide improved rate performance in certain embodiments. The supplemental positive and/or negative current collectors may be formed on the electrode structure using similar methods as those described in connection with the formation of the positive and negative electrode current collectors. Known methods for masking and patterning may be used to prepare the backbones for selectively depositing the supplemental current collectors at the desired areas. In some instances, the deposition of the current collector would be performed after the active electrode is deposited in order to provide an ionically permeable current collection scheme.

Referring to FIG. 3, the negative electrode material layer 49 may be formed or otherwise assembled using methods such as electrodeposition, electrophoretic deposition, vapor deposition, catalyst based growth such as Vapor-Liquid-Solid deposition, gel-casting, tape casting, patterning and slurry deposition followed by densification by methods such as sintering, binding etc. In some embodiments, the negative electrode material layer and the negative backbone may comprise the same material, such as silicon, aluminum, and tin, and the negative electrode material layer and the negative electrode backbone may be fabricated simultaneously. Similarly, positive electrode material layer 50 may be assembled using methods such as electrodeposition, electrophoretic deposition, vapor deposition, catalyst based growth such as Vapor-Liquid-Solid deposition, gel casting, tape casting, patterning and slurry deposition followed by densification by methods such as pressing, sintering, binding, curing, etc.

Still referring to FIG. 3, microporous separator layer 43 may be formed any of a range of conventional methods. Exemplary methods include electrophoretic deposition, vapor deposition, dip coating, gel casting, tape casting, patterning and slurry deposition followed by densification by methods such as pressing, sintering, binding, curing, and the like.

Figure 11:
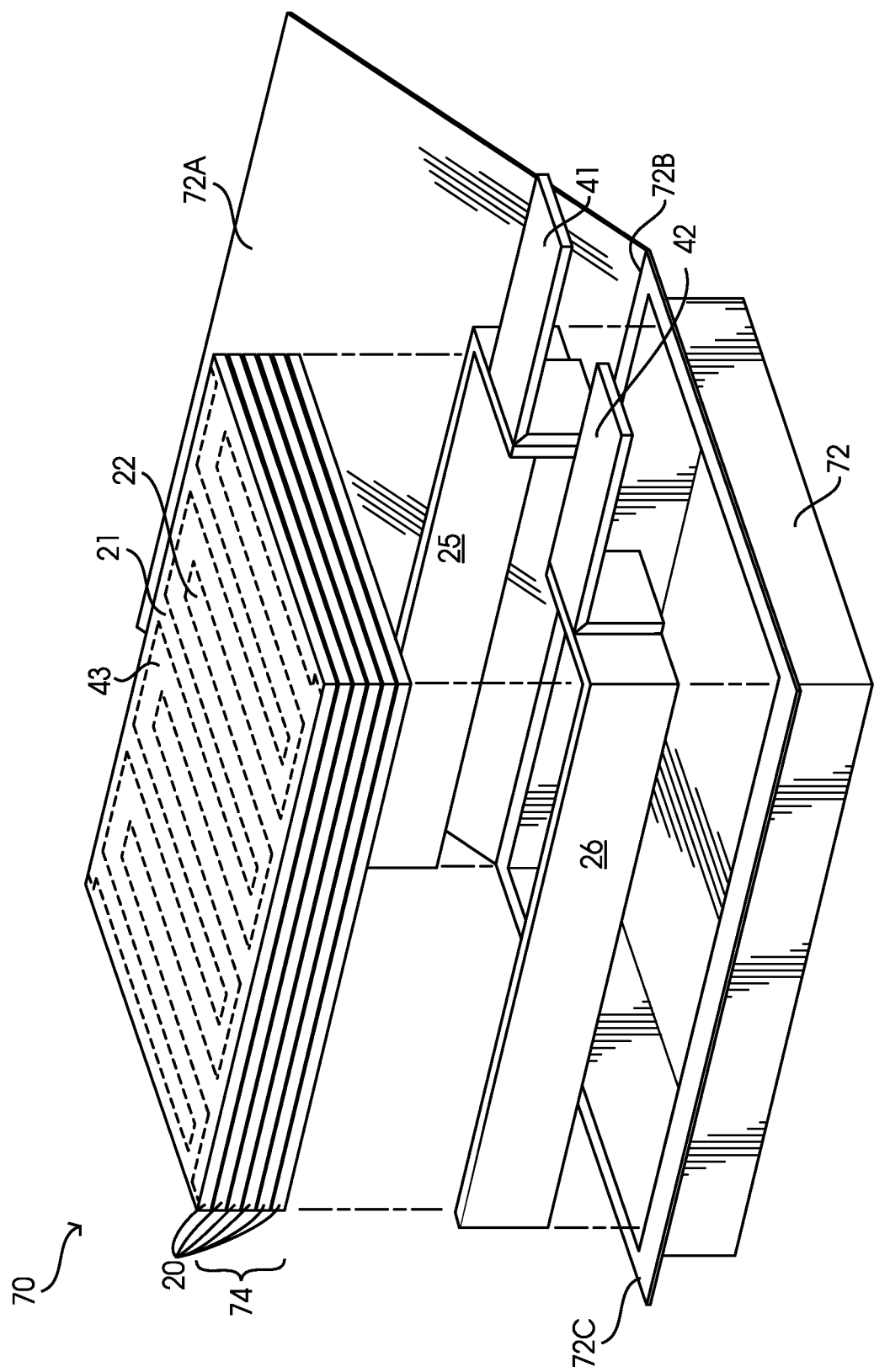
FIG. 11 is an exploded view of a three-dimensional secondary battery of the present invention.

Referring now to FIG. 11, in one embodiment a three-dimensional battery 70 of the present invention comprises battery enclosure 72, electrode stack 74, negative electrode tab 41 and positive electrode tab 42 for electrically connecting electrode stack 74 to an external energy supply or consumer (not shown). Electrode stack 74 comprises six electrode structures 20 (see FIG. 2) stacked in a direction that is perpendicular to the direction of the progression of the series of interdigitated electrodes within each electrode structure 20; referring again to FIG. 2, the direction of stacking of the six electrode structures in this embodiment is in the "Z" direction relative to the X-Y-Z coordinate system illustrated in FIG. 2 and perpendicular to direction D. The number of electrode structures in an electrode stack 74 is not critical and may range, for example, from 1 to 50, with 2 to 20 electrode structures in an electrode stack being typical. After filling the battery enclosure with a non-aqueous electrolyte, battery enclosure 72 may be sealed by folding lid 72A at hinge 72B and gluing lid 72A to upper surface 72C.

Advantageously, negative electrode tab extension 25 is electrically connected to the negative electrode bus 23 of each electrode structure 20 in stack 74 (using, for example, an electrically conductive glue) and positive electrode bus 26 is electrically connected to the positive electrode bus 24 of each electrode structure 20 in stack 74 (using, for example, an electrically conductive glue). As illustrated, negative electrode tab extension 25 is electrically connected to the negative electrode bus 23 and positive electrode tab extension 26 is electrically connected to the positive electrode bus 24 of each of six electrode structures 20; in other embodiments, negative and positive electrode tab extensions 25, 26 may be electrically connected to a greater or lesser number of negative and positive electrode buses within an electrode stack 74 and may range, for example, from 1 to 50, with 2 to 20 being typical. In one alternative embodiment, and independent of the number of electrode structures in a stack, stack 74 may comprise two or more negative electrode tab extensions 25 and two or more positive electrode tab extensions 26.

Tab 41 may be electrically connected to negative electrode tab extension 25 using, for example, an electrically conductive glue and tab 42 may be electrically connected to positive electrode tab extension 26 using, for example, an electrically conductive glue. Alternatively, tabs 41, 42 may be the folded ends of negative electrode tab extension 25 and positive electrode tab extension 26, respectively.

Figure 12:
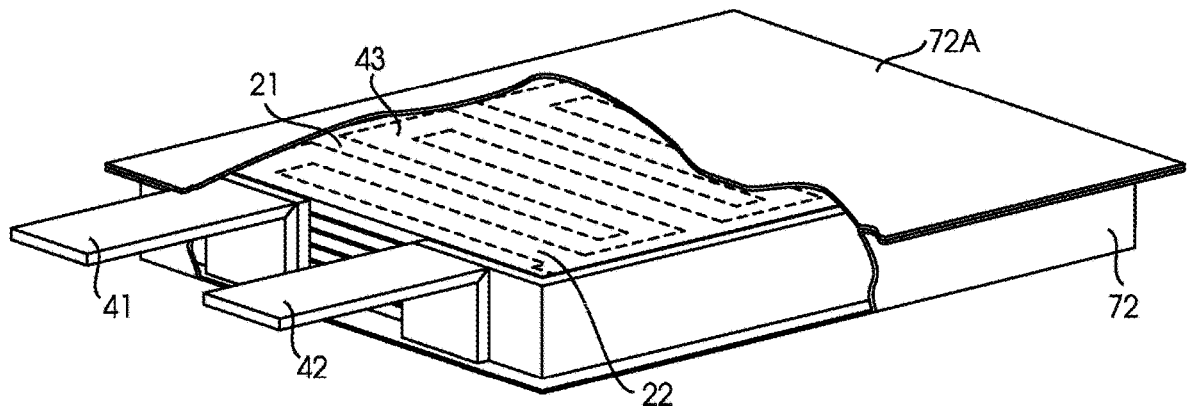
FIG. 12 is a fragmentary perspective view of the assembled three-dimensional secondary battery of FIG. 11.

Referring now to FIG. 12, battery enclosure 72 is filled with non-aqueous electrolyte (not shown) and lid 72A may be folded over and sealed to upper surface (see FIG. 11)) to enclose electrode stack 74. To permit connection to an energy supply or consumer (not shown), tabs 41, 42 extend out of the sealed enclosure in a direction that is perpendicular to the direction of stacking of the individual electrode structures 20 in electrode stack 74 and parallel to the direction of the progression of the series of interdigitated electrodes in each electrode structure 20 in electrode stack 74.

In certain embodiments, a battery enclosure may contain two more electrode structures (sometimes also referred to as dies) stacked vertically, horizontally or vertically and horizontally, relative to each other, and the tab extensions are connected to each of the electrode in order to provide electrical connection to the environment outside the battery. When dies are stacked vertically, the bottoms of the populations of negative electrodes in different electrode structures (or the negative electrode buses, whichever is present) are vertically positioned relative to each other and the bottoms of the populations of positive electrodes in different electrode structures (or the positive electrode buses, whichever is present) are vertically positioned relative to each other. In certain embodiments, each electrode structure in a stack has a top and bottom coating of separator material as illustrated in FIG. 2. In other embodiments, however, the top, bottom or top and bottom coating of separator material may be omitted, and a free-standing separator layer may be inserted between the electrode structures (dies) to provide electrical isolation. Commercially available battery separators may be cut to the desired size and used for this purpose. Once the dies are stacked, in some embodiments, the tab extension(s) for the positive and negative electrode populations in the electrode structures are electrically connected to the ends of the electrode buses (if present) or the electrode ends of the respective populations by gluing, plasma spraying, welding, etc. Depending upon the intended application, each tab extension may be connected to an individual electrode structure (die) in the electrode stack. Alternatively, a single tab extension may be electrically connected to two or more electrode structures (die) in the stack; in one such embodiment, the tab extension spans the height of the stack (see, e.g., 26 in FIG. 11) and makes electrical connection to all electrode structures (die) in the stack.

Figure 13:
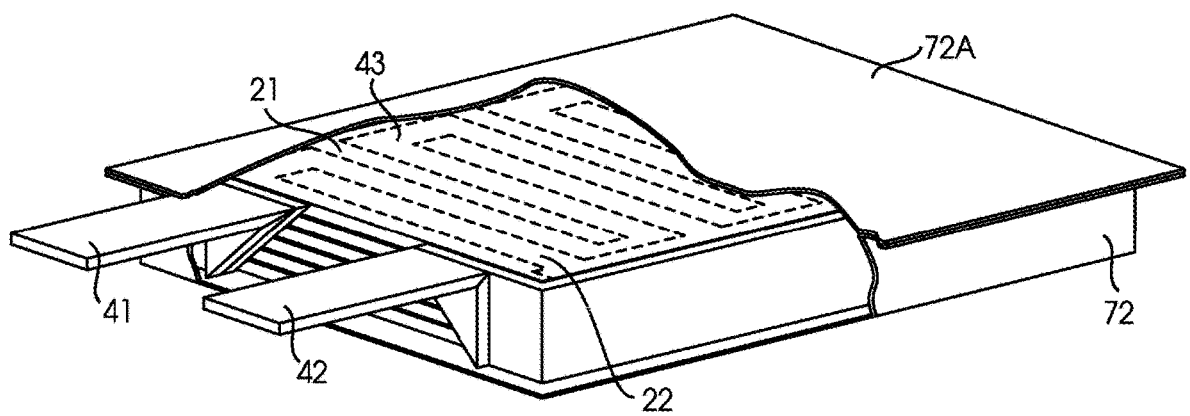
FIG. 13 is a fragmentary perspective view of an alternative embodiment of the assembled three-dimensional secondary battery of FIG. 11.
Figure 14:
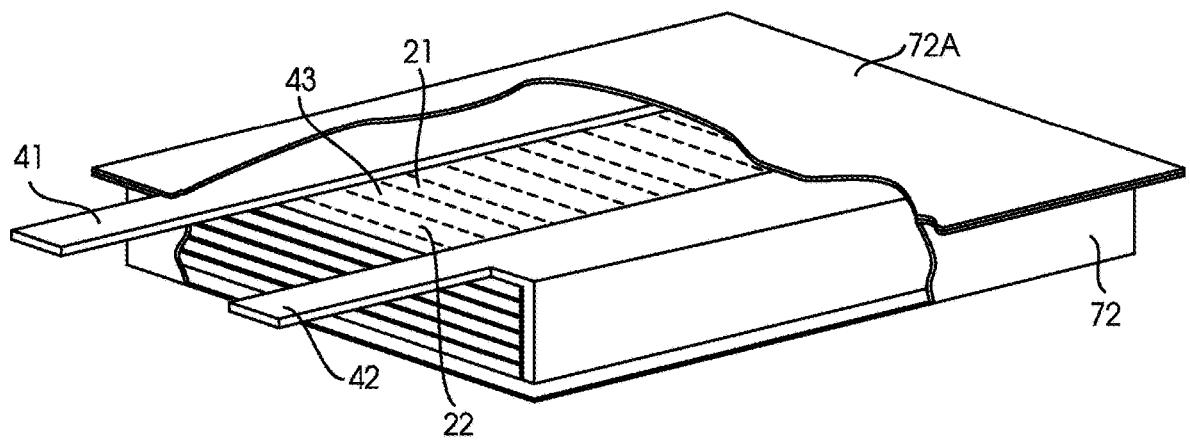
FIG. 14 is a fragmentary perspective view of an alternative embodiment of the assembled three-dimensional secondary battery of FIG. 11.
Figure 15:
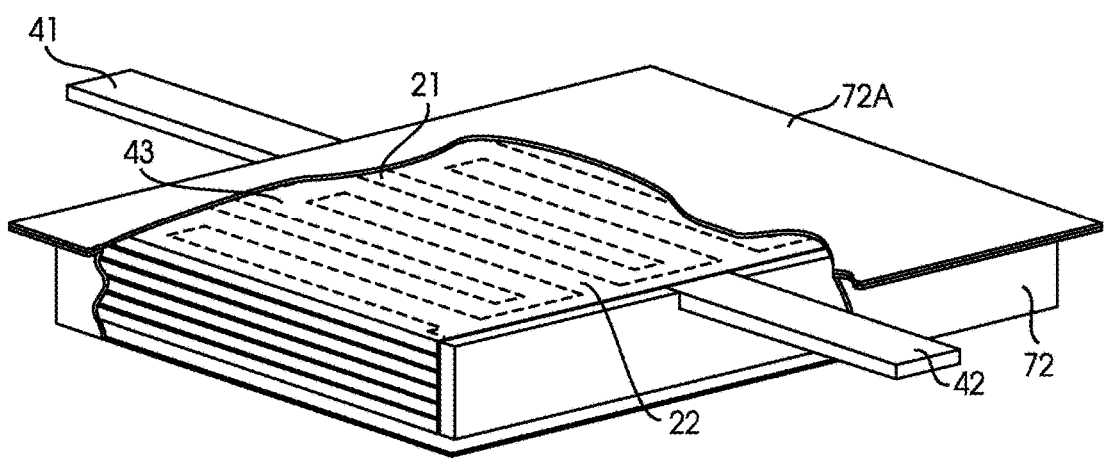
FIG. 15 is a fragmentary perspective view of an alternative embodiment of the assembled three-dimensional secondary battery of FIG. 11.
Figure 16:
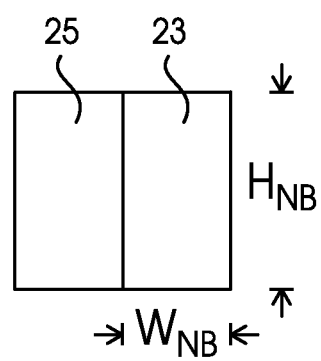
FIG. 16 is a cross-section of a subassembly of the electrode structure taken in the plane containing line 16-16 of FIG. 5.
Figure 17:
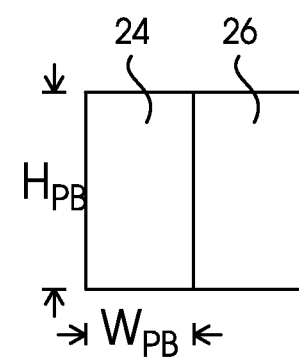
FIG. 17 is a cross-section of a subassembly of the electrode structure taken in the plane containing line 17-17 of FIG. 6.

Referring now to FIGS. 13-15, alternative configurations for tabs 41, 42 are illustrated. In FIG. 13, tabs 41, 42 are folded tabs 41, 42 are the folded ends of negative electrode tab extension 25 and positive electrode tab extension 26, respectively, folded at a 45 degree angle; in this embodiment, tabs 41, 42 extend out of the sealed enclosure in a direction that is perpendicular to the direction of stacking of the individual electrode structures 20 in electrode stack 74 and parallel to the direction of the progression of the series of interdigitated electrodes in each electrode structure 20 in electrode stack 74. In FIG. 14, negative electrode tab extension 25 and positive electrode tab extension 26 fold over the top of the stack of electrode structures and tabs 41, 42 extend from one respective end thereof; in this embodiment, tabs 41, 42 extend out of the sealed enclosure in a direction that is perpendicular to the direction of stacking of the individual electrode structures 20 in electrode stack 74 and parallel to the direction of the progression of the series of interdigitated electrodes in each electrode structure 20 in electrode stack 74. In FIG. 15, tabs 41, 42 are not located at one of the respective ends of negative and positive electrode tab extensions 25, 26, but rather from a point intermediate of the two ends; in this embodiment, tabs 41, 42 extend out of the sealed enclosure in a direction that is perpendicular to the direction of stacking of the individual electrode structures 20 in electrode stack 74 and perpendicular to the direction of the progression of the series of interdigitated electrodes in each electrode structure 20 in electrode stack 74.

Instead of stacking dies vertically one on top of another, in one embodiment dies are tiled next to each other in the X plane. The tiling can occur along only one axis (for example X only) or along both axis. In one such embodiment the polarity of the electrode buses on each die are alternately reversed so that the cathode bus from one die is adjacent the cathode bus from the next die and the anode bus of one die is next to the anode bus of the next die. In this manner, a common tab can be used to connect to two adjacent die saving weight and volume. When tiling in the XY plane, multiple anode and/or cathode tabs may need to be connected together to form a single anode connection and a single cathode connection. This can be achieved inside the battery enclosure or outside the battery enclosure. In certain embodiments multiple anode tabs and/or multiple cathode tabs may remain unconnected and come out of the battery enclosure. Alternatively, a single anode and cathode connection may be brought outside the battery enclosure. In this embodiment, the cathode tabs are initially shaped in a T configuration. The top of the T connects to two adjacent cathode buses. The bottom of the T is bent at 90 degrees and runs along the bottom of the tiled dies. The bottom portion of multiple cathode tabs lay on top of each other along the bottom of the tiled dies. These multiple tabs can then be electrically connected together by resistance welding, laser welding, spot welding or connected with conductive glue. Only one of these cathode tabs is then brought outside the battery enclosure. Similarly, multiple anode tabs are initially shaped in a T configuration. The top of the T connects to two adjacent anode buses. The bottom of the T is bent at 90 degrees and runs along the bottom of the tiled dies. The bottom portion of multiple anode tabs lay on top of each other along the bottom of the tiled dies. These multiple tabs can then be electrically connected together by resistance welding, laser welding, spot welding or connected with conductive glue. Only one of these anode tabs is then brought outside the battery enclosure. Tiling in the XY plane can also be combined with stacking die in the Z plane. In this manner, batteries can be manufactured that are much larger than each individual die.

For lithium ion batteries for portable electronics such as mobile phones and computers, for example, a pouch or other conventional battery enclosure may be substituted for battery enclosure 72.

Instead of a rectangular cross-sectional shape as illustrated in FIGS. 7 and 8, members of the populations of negative and positive electrodes may independently have a range of alternative cross-sectional profiles. For example, members 21 and members 22 of the populations of negative and positive electrodes may have a polygonal cross-sectional shape (e.g., a triangular, quadrilateral, pentagonal or hexagonal cross-section or a smooth-curved cross-section (e.g., elliptical or circular) or a combination thereof. In general, therefore, members of the populations of negative and positive electrodes may independently have a range of polyhedral, conical or cylindrical (e.g., elliptic cylinder, parabolic cylinder, or hyperbolic cylinder) shapes. FIGS. 18A-E illustrate several such alternative cross-sectional shapes.

The following non-limiting examples are provided to further illustrate the present invention.

EXAMPLES

Example 1: 3D Single Cell Fabrication

Comb Structure Fabrication

A silicon on insulator (SOI) wafer with a layer thickness of 200 µm/3 µm/675 µm (device layer/insulating layer/ backing layer) was used as the sample. 1000 Å of Pd was sputter deposited on top of the device layer followed by a hard mask layer of 2000 Å silicon dioxide.

This wafer was then spin coated with 5 μm of resist and patterned with a mask to obtain a comb shaped structure with two interdigitated combs isolated from each other and each terminating in a landing pad suitable for making electrical contact. The photoresist in this pattern was then used as a photomask to remove the silicon dioxide and palladium by ion milling.

The combination of silicon dioxide, photoresist, and Pd was used as a mask for Silicon removal using Deep Reactive Ion Etching (DRIE) in a fluoride plasma. The DRIE was performed until the silicon constituting the device layer in the mask gaps was completely removed, stopping on the oxide layer. The over-etch time used was 10% of the total DRIE time in order to remove islands of silicon in the trench floor. Any top photoresist was removed by stripping in acetone leaving two combs electrically isolated from each other by the DRIE.

The top masking oxide layer was subsequently removed by dipping the sample for 1 minute in dilute (5:1) Buffered Oxide Etch (BOE) solution with the dissolution time being tailored so that the insulating oxide layer in the bottom of the trench was not completely etched off.

The comb structure with isolated anode combs and cathode combs was used as the base structure for current collector and electrode fabrication.

2. Anode Current Collector and Anode Electrode Fabrication

One of the isolated pair of comb-like structures (herein named the anode backbone comb) was electrically connected through the palladium conductor and was immersed in a copper plating bath. The copper plating bath conditions were adjusted such that the deposition happened both on the palladium and the silicon layer constituting the comb structure to form a Cu layer that served as the anode current collector.

The other comb structure (herein named the cathode backbone comb) was subsequently immersed in an electrophoretic resist bath. A commercially available electrophoretic resist was used (Shipley EAGLE), and the comb was electrophoretically deposited at 50 V for 120 seconds using the Pd conductor to form a resist coating. The die was baked at 120 C for 30 min to harden the resist.

The silicon sample was then inserted into an evaporation chamber, and 20 Å Au is deposited on the sample surface. This Au deposition process resulted in Au on the top of the honeycomb structures as well as on its sidewalls and on the bottom oxide layer. The photoresist present on the cathode backbone comb caused the Au to be in contact with the only the copper on the anode backbone comb structure. The silicon backing layer was protected at this time by an adhesive tape mask and the sample was immersed in acetone for 15 min to remove the electrophoretic resist along with the evaporated Au on top of the electrophoretic resist. This isolated the Au nanoclusters to the anode backbone comb only.

Silicon nanowires were then grown on top of the anode backbone comb structure by chemical vapor deposition (CVD). The sample was inserted into a CVD chamber and heated to 550° C. Silane gas was introduced into the chamber; the reactor pressure was kept at 10 Torr. The deposition rate was 4 μm/hr; and the deposition was done to a target nanowire thickness of 20 μm. These nanowires on top of the anode backbone comb served as the anode for the lithium-ion battery.

3. Cathode Current Collector and Cathode Electrode Fabrication

The cathode backbone comb was then electrically connected through the palladium conductor and immersed in a gold electroplating bath to plate gold on the palladium and the silicon layer constituting the comb structure. This Au layer surrounding the cathode backbone comb served as the cathode current collector.

The cathode backbone comb was electrophoretically deposited with a lithium ion battery cathode material. The Electrophoretic deposition solution contained the cathode material ($LiCoO_2$), 15 wt % carbon black, and 150 ppm of iodine in a solution of acetone. The solution mixture was stirred overnight to disperse the particles uniformly. The Pd contact pad was used as the terminal for electrical connection for the cathode deposition. A Pt counter electrode was used. The sample was deposited for 3 min at a voltage of 100V to deposit a 40 μm thick cathode structure.

4. Separator Fabrication

The sample was sent to a spin coater where the microporous separator was applied onto the battery. The microporous separator in this case was a combination of fine glass powder (<2 um diameter) dispersed in acetone along with a PVDF binder of 2 volume percent. This slurry was coated on to the die and the excess slurry is spun off to fill and planarize the separator layer. The drying process resulted in the solvent evaporating and forming a microporous separator layer.

5. Structural Layer Removal

The top side of the die was subsequently bonded to a sacrificial glass substrate with the aid of a UV release dicing tape. This arrangement was used to mechanically remove the backing silicon layer using conventional wafer lapping techniques. The lapping process was carried on until the backing wafer was removed and the intermediate oxide layer was exposed. The UV release was used to remove the active die off the sacrificial glass substrate; thereby making the die ready for subsequent current collection and packaging process.

Example 2: 3D Single Cell Fabrication

1. Comb Structure Fabrication

The comb structure for this example was fabricated as described in Example

2. Anode Current Collector and Anode Electrode Fabrication

One of the isolated pair of comb-like structures (herein named the anode backbone comb) was electrically connected through the palladium conductor and was immersed in a copper plating bath. The copper plating bath conditions were adjusted such that the deposition happened both on the palladium and the silicon layer constituting the comb structure. This Cu layer served as the anode current collector The anode backbone comb was used to electrophoretically deposit graphite particles onto the comb surface using a non-aqueous electrophoretic deposition slurry. The deposition slurry consisted of graphite particles (mesocarbon microbeads, 95% by weight) and carbon black (5% by weight) dispersed in acetone with 25 ppm of iodine as the charging agent. Electrophoretic deposition was done with a platinum counter electrode at 100 V for 180 s to deposit a 60 um average film thickness 3. Cathode Current Collector and Cathode Electrode Fabrication The cathode backbone comb layer was subsequently electrically connected through the palladium conductor and was immersed in a gold plating bath to plate gold on the palladium and the silicon layer constituting the comb structure. This Au layer surrounding the cathode backbone comb will serve as the cathode current collector.

The anode backbone comb along with the anode electrode was immersed in an electrophoretic resist bath. A commercially available electrophoretic resist was used (Shipley EAGLE), and the comb was electrophoretically deposited at 75 V for 180 seconds using the Pd/Cu conductor to form a resist coating. The die was baked at 120 C for 30 min to harden the resist.

The die was subsequently coated with a slurry of a lithium ion cathode material of the following composition: Lithium Cobalt oxide 80 g; graphite 5 g, carbon black 5 g, and PVDF 10 g; all mixed in N-Methyl Pyrollidone and acetone as the quick-drying solvent with a volume ratio of 1:2. The slurry was dried and the solvent was evaporated to leave conductive cathode material behind. This material was then lapped to the comb surface in order to expose the electrophoretically deposited resist on the anode-comb. The resist was removed by stripping in PGMEA to leave a void for the separator fill.

4. Separator fabrication

The separator was fabricated as described in Example 1.

5. Structural Layer Removal

The structural layer was removed as described in Example 1

Example 3: 3D Single Cell Fabrication

1. Comb Structure Fabrication

The comb structure was prepared as described in Example 1.

2. Anode Current Collector and Anode Electrode Fabrication

One of the isolated comb structures (herein named the cathode backbone comb) was immersed in an electrophoretic resist bath. A commercially available electrophoretic resist was used (Shipley EAGLE), and the cathode backbone comb was electrophoretically deposited at 50 V for 120 seconds using the Pd conductor to form a resist coating. The die was baked at 120 C for 30 min to harden the resist.

The silicon sample was then inserted into an evaporation chamber, and 100 Å Au was deposited on the sample surface. This Au deposition process resulted in Au on the top of the comb, its sidewalls, and on the bottom oxide layer. However, the photoresist being present on one of the combs causes the Au to be in contact with the silicon on only one of the two comb structures. The silicon backing layer was also protected at this time by an adhesive tape mask. This sample was subsequently immersed in a solution of 1:1 by volume of hydrofluoric acid (49%) and hydrogen peroxide (30%), at 30 C to form a porous silicon layer. The porous silicon depth was tailored by varying the etching time. The approximate rate of formation of porous silicon was 750-1000 nm/min. The parts were removed and dried when a target pore depth of 30 μm was reached.

The porous silicon was formed only on the comb-set that did not have the electrophoretic resist patterned onto it. The porous silicon set was suitable for use as the anode in a lithium ion battery. The electrophoretic resist was subsequently stripped in acetone for 15 minutes.

The anode backbone comb was subsequently electrically connected through the palladium conductor and was immersed in a copper plating bath consisting of very dilute (10 mM) copper sulfate and sulfuric acid. The copper plating bath conditions were adjusted such that the deposition happened both on the palladium and the porous silicon. The copper concentration was kept low so that the copper deposition was transport limited and porous along the outer layer of the porous silicon. This Cu layer may serve as the anode current collector that is also ionically permeable due to its porosity. The copper on the Pd layer, however, was thicker and non-porous to act as a secondary bussing collector for the anode.

3. Cathode Current Collector and Cathode Electrode Fabrication

The cathode current collector and cathode electrode was prepared as described in Example 2.

4. Separator Fabrication

The separator was prepared as described in Example 2.

5. Structural Layer Removal

The structural layer was removed as described in Example 2.

Example 4: 3D Single Battery Fabrication

1. Single Die Preparation

The contact pads that were used to process the dies in Examples 1-3 were removed by dicing using a dicing saw, while leaving the anode and cathode bus connections intact. Any separator material covering the edges of the dies and overhanging the bus lines were cleaned out to remove and expose the current collector material, Cu in the case of the anode and Au in case of the cathode.

2. Tab Extension Connection:

Tab extensions were connected onto the anode bus and the cathode bus following the current collector exposure. The gold bus line was connected to aluminum tab using a commercially available carbon glue (DAG-T-502). A thin layer of carbon was coated on the tab extension and glued to the side of the gold bus. A nickel tab extension was glued to the copper current collector bus using the same commercially available carbon glue. The glue was baked at 120 C for 1 hr to harden. The tab extensions also included the tab that was to come out of the package. This tab extension was bent and flattened horizontally and was ready for packaging.

Battery Packaging and Electrolyte Fill:

The die with the two tab extensions was inserted into a commercially available battery pouch packaging material. The pouch material was sealed on the tab side through the tabs. One of the other three sides was left open to provide a port for electrolyte filling. Vacuum was applied and a conventional electrolyte comprising propylene carbonate, ethylene carbonate, and ethyl methyl carbonate in a ratio of 1:1:3 and a lithium hexafluorophosphate salt (1 M) was added to the cell while in a glove box. The last side of the pouch was also subsequently sealed when the die is inside the glove box in order to prevent moisture and oxygen from ingressing into the pouch and causing loss of battery life the assembled package corresponding to the schematic illustrated in FIG. 12. The battery was then subsequently charge-discharged using a commercially available battery cycler.

Example 5: 3D Single Battery Fabrication

1. Single Die Preparation

Die preparation was carried out as in Example 4.

2. Tab Extension Connection:

Tab extensions were connected onto the anode bus and the cathode bus following the current collector exposure. An aluminum tab extension (150 μm thick) was ultrasonically welded onto the bus surface in multiple spots along the bus line in order to provide good adhesion of the tab extension to the bus line. Subsequently, a 200 µm Ni tab extension was connected to the copper bus line using a resistance welder. Again, multiple connections were made in order to provide good adhesion of the tab extension to the bus line. The tab extensions also included the tab that was to come out of the package. This tab extension was bent and flattened horizontally (as illustrated in FIG. 12) and was ready for packaging.

3. Battery Packaging and Electrolyte Fill

Battery packaging and electrolyte fill was carried out as in Example 4.

Example 6: 3D Single Battery Fabrication

1. Single Die Preparation

The contact pads that were used to process the dies in Examples 1-3 were removed by dicing using a dicing saw. In addition, the cathode and anode bus connections were also diced to leave behind the ends of the anode and cathode backbones exposed on the sides.

2. Tab Extension Connection:

Tab extensions were connected similar to Example 4, except for the connections being made directly to each of the anode backbones and the cathode backbones instead of connecting to the bus layers. In this case, the tab extension and the glue layer used to connect the tab extension acts as the bussing layer for each electrode as well.

3. Battery Packaging and Electrolyte Fill

Battery packaging and electrolyte fill was carried out as in Example 4.

Example 7: 3D Single Battery Fabrication

1. Single Die Preparation

The single die preparation process was performed as described in Example 6.

2. Bus Formation

A 50 µm thick layer of aluminum was flame sprayed onto the sides of the cathode ends after masking the top and bottom of the die and ensuring that the flame spray layer was only along the cross section of the die. This flame sprayed layer made contact to each of the exposed individual cathode back bone and current collectors and bussed them together making a cathode bus. A similar process was used on the anode side with nickel flame spray to create a flame sprayed anode bus.

3. Tab Extension Connection:

Tab extensions were connected as described in Example 4, except for the connections being made to the thermal sprayed anode and cathode bus layers.

4. Battery Packaging and Electrolyte Fill

Battery packaging and electrolyte fill was carried out as in Example 4.

Example 8: 3D Single Battery Fabrication

1. Single Die Preparation

The Single die preparation process was performed identical to Example 6.

2. Bus Formation:

The bus formation process was performed identical to Example 7.

3. Tab Connection:

Tab was welded to the top of the thermal sprayed bus layers, Al on cathode and Ni on anode; and the tabs directly came out from the short dimension of the battery.

4. Battery Packaging and Electrolyte Fill

Battery packaging and electrolyte fill was carried out as in Example 4.

Example 9: 3D Stacked Battery Fabrication

1. Single Die Preparation

The Single die preparation process was performed identical to Example 7; except on three different dies separately.

2. Bus Formation:

The dies were stacked vertically on top of one another prior to thermal spray depositing Aluminum and Nickel bus layers on the cathode and anode ends respectively. The thermal sprayed Aluminum created an electrode bus for each of the dies in addition to creating a single cathode bus for all of the dies. Similarly, the thermal sprayed Ni created the anode bus for each and all dies.

3. Tab Connection:

Tab was welded to the top of the thermal sprayed bus layers, Al on cathode and Ni on anode; and the tabs directly came out from the short dimension of the battery.

4. Battery Packaging and Electrolyte Fill

Battery packaging and electrolyte fill was carried out as in Example 4.

Example 10: 3D Tiled Battery Fabrication

1. Single Die Preparation

The Single die preparation process was carried out as in Example 7; except on three different dies separately.

2. Bus Formation:

The bus formation by thermal spray similar to example 7 on all the dies individually.

3. Tab Extension Connection:

The tab extension was connected with conductive glue similar to example 7. However, the dies were tiled with the cathode bus connections abutting each other connected by a single tab extension in between.

4. Battery Packaging and Electrolyte Fill

Battery packaging and electrolyte fill was carried out as in Example 4.

In view of the above, it will be seen that the several objects of the invention are achieved and other advantageous results attained.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above articles, compositions and methods without departing from the scope of the invention, it is intended that all matter contained in the above description and shown in the accompanying drawings shall be interpreted as illustrative and not in a limiting sense.

What is claimed is:

1. An electrode structure comprising a population of electrodes, an electrode bus, a population of counter-electrodes and a microporous separator separating members of the electrode population from members of the counter-electrode population, the populations of electrodes and counter-electrodes being arranged in an alternating sequence in which members of the electrode population are separated from each other by members of the counter-electrode population with the alternating sequence proceeding in a first direction, each member of the electrode population comprising an electrode active material layer and an electrode current collector layer having lateral surfaces, each member of the electrode population having a bottom, a top, a length $L_E$, a width $W_E$ and a height $H_E$, the length $L_E$ being measured from the bottom to the top of each such electrode, the width $W_E$ and the height $H_E$ being measured in directions that are perpendicular to each other and to the direction of measurement of the length $L_E$, the ratio of $L_E$ to each of $W_E$ and $H_E$ being at least 5:1, respectively, the ratio of $H_E$ to $W_E$ being between 0.4:1 and 1000:1, respectively, wherein (i) the electrode active material layer is disposed on each of the lateral surfaces of the electrode current collector layer in members of the electrode population, (ii) the electrode current collector layer of each member of the electrode population has a length $L_{E-C}$ that is measured in the same direction as and is at least 50% of length $L_E$, (iii) the electrode current collector layer of each member of the electrode population is attached and electrically connected to the electrode bus which, in turn, pools current from all of the members of the electrode population and provides an electrically conductive pathway between each individual member of the electrode population and a battery terminal, (iv) the electrode bus has a length $L_{E-B}$, a width $W_{E-B}$ and a height $H_{E-B}$, the length $L_{E-B}$ being measured in the first direction and the width $W_{E-B}$ and the height $H_{E-B}$ being measured in directions that are mutually perpendicular to each other and perpendicular to the first direction with the ratio of $L_{E-B}$ to each of $W_{E-B}$ and $H_{E-B}$ being at least 5:1, and (v) the electrode population has N members, the counter-electrode population has N+1 members, and N is at least 10.

2. The electrode structure of claim 1 wherein the electrode population has N members, the counter-electrode population has N+1 members, and N is at least 25.

3. The electrode structure of claim 1 wherein $L_E$ has a value in the range of about 10 mm and about 250 mm.

4. The electrode structure of claim 1 wherein $W_E$ and $H_E$ each have a value in the range of about 0.01 mm and 5 mm.

5. The electrode structure of claim 1 wherein the ratio of $L_E$ to each of $W_E$ and $H_E$ for each member of the electrode population is at least 10:1, respectively.

6. The electrode structure of claim 1 wherein the electrode current collector layer of each member of the electrode population has a length $L_{E-C}$ that is measured in the same direction as and is at least 80% of $L_E$.

7. The electrode structure of claim 1 wherein each member of the counter-electrode population comprises a counter-electrode active material layer and a counter-electrode current collector layer, each member of the counter-electrode population having a bottom, a top, a length $L_{CE}$, a width $W_{CE}$ and a height $H_{CE}$, the length $L_{CE}$ being measured from the bottom to the top of each such counter-electrode, the width $W_{CE}$ and the height $H_{CE}$ being measured in directions that are perpendicular to each other and to the direction of measurement of the length $L_{CE}$, the ratio of $L_{CE}$ to each of $W_{CE}$ and $H_{CE}$ being at least 5:1, respectively, the ratio of $H_{CE}$ to $W_{CE}$ being between 0.4:1 and 1000:1, respectively, the counter-electrode current collector layer of each member of the counter-electrode population having a length $L_{CE-C}$ that is measured in the same direction as and is at least 50% of length $L_{CE}$.

8. The electrode structure of claim 1 wherein the electrode current collector layer and the electrode active material layer have an electrical conductance and the ratio of the electrical conductance of the electrode current collector layer to the electrical conductance of the electrode active material layer is at least 100:1, respectively, for each member of the population of electrodes.

9. The electrode structure of claim 1 wherein the population of electrodes is a population of negative electrodes, the population of counter-electrodes is a population of positive electrodes, the electrode active material layer is a negative electrode active material layer and the electrode current conductor layer is a negative electrode current conductor layer wherein the negative electrode active material layer comprises carbon, aluminum, tin, silicon or an alloy thereof.

10. The electrode structure of claim 9 wherein the negative electrode active material layer comprises nanowires of silicon or an alloy thereof, or porous silicon or an alloy thereof.

11. The electrode structure of claim 1 wherein the population of electrodes is a population of negative electrodes, the population of counter-electrodes is a population of positive electrodes, each member of the population of negative electrodes comprises a negative electrode active material layer and a negative electrode current conductor layer, each member of the population of negative electrodes has a bottom, a top, a length $L_{NE}$, a width $W_{NE}$ and a height $H_{NE}$, the length $L_{NE}$ being measured from the bottom to the top of each such negative electrode, the width $W_{NE}$ and the height $H_{NE}$ being measured in directions that are perpendicular to each other and to the direction of measurement of the length $L_{NE}$, the ratio of $L_{NE}$ to each of $W_{NE}$ and $H_{NE}$ being at least 5:1, respectively, the ratio of $H_{NE}$ to $W_{NE}$ being between 0.4:1 and 1000:1, the negative electrode current collector layer of each member of the negative electrode population having a length $L_{NC}$ that is measured in the same direction as and is at least 50% of $L_{NE}$.

12. The electrode structure of claim 1 wherein the population of electrodes is a population of positive electrodes, the population of counter-electrodes is a population of negative electrodes, (i) each member of the population of positive electrodes comprises a positive electrode active material layer and a positive electrode current conductor layer, each member of the population of positive electrodes has a bottom, a top, a length $L_{PE}$, a width $W_{PE}$ and a height $H_{PE}$, the length $L_{PE}$ being measured from the bottom to the top of each such positive electrode, the width $W_{PE}$ and the height $H_{PE}$ being measured in directions that are perpendicular to each other and to the direction of measurement of the length $L_{PE}$, the ratio of $L_{PE}$ to each of $W_{PE}$ and $H_{PE}$ being at least 5:1, respectively, the ratio of $H_{PE}$ to $W_{PE}$ being between 0.4:1 and 1000:1, respectively, the positive electrode current collector layer of each member of the positive electrode population having a length $L_{PC}$ that is measured in the same direction as and is at least 50% of $L_{PE}$, and (ii) each member of the population of negative electrodes comprises a negative electrode active material layer and a negative electrode current conductor layer, each member of the population of negative electrodes has a bottom, a top, a length $L_{NE}$, a width $W_{NE}$ and a height $H_{NE}$, the length $L_{NE}$ being measured from the bottom to the top of each such negative electrode, the width $W_{NE}$ and the height $H_{NE}$ being measured in directions that are perpendicular to each other and to the direction of measurement of the length $L_{NE}$, the ratio of $L_{NE}$ to each of $W_{NE}$ and $H_{NE}$ being at least 5:1, respectively, the ratio of $H_{NE}$ to $W_{NE}$ being between 0.4:1 and 1000:1, respectively, the negative electrode current collector layer of each member of the negative electrode population having a length $L_{NC}$ that is measured in the same direction as and is at least 50% of $L_{NE}$.

13. An electrode stack, the stack comprising at least two electrode structures, each of the electrode structures comprising an electrode structure of claim 1.

14. The electrode stack of claim 13 wherein the electrode structures are stacked vertically whereby the populations of positive and negative electrodes comprised by a first electrode structure in the electrode stack lie in a different plane than the populations of positive and negative electrodes comprised by a second electrode structure in the electrode stack.

15. The electrode stack of claim 13 wherein the electrode structures are arranged horizontally whereby the populations of positive and negative electrodes comprised by a first electrode structure in the electrode stack lie in substantially the same plane as the populations of positive and negative electrodes comprised by a second electrode structure in the electrode stack.

16. A secondary battery comprising a battery enclosure, a non-aqueous electrolyte and an electrode structure of claim 1.

17. A secondary battery comprising a battery enclosure, a non-aqueous electrolyte and an electrode stack of claim 13.

\* \* \* \* \*